(12) United States Patent
Henderson et al.

(10) Patent No.: US 7,532,311 B2
(45) Date of Patent: May 12, 2009

(54) EFFICIENT LIDAR WITH FLEXIBLE TARGET INTERROGATION PATTERN

(75) Inventors: Sammy W. Henderson, Boulder, CO (US); Paul J. M. Suni, Berthoud, CO (US)

(73) Assignee: Lockheed Martin Coherent Technologies, Inc., Louisville, CO (US)

( * ) Notice: Subject to any disclaimer, the term of this patent is extended or adjusted under 35 U.S.C. 154(b) by 158 days.

(21) Appl. No.: 11/100,082

(22) Filed: Apr. 6, 2005

(65) Prior Publication Data

US 2006/0227317 A1 Oct. 12, 2006

(51) Int. Cl.
*G01C 3/08* (2006.01)

(52) U.S. Cl. .................. 356/4.01; 356/28; 356/614; 356/622; 382/210; 382/154; 382/106

(58) Field of Classification Search ............ 356/28, 356/4.01, 614, 622; 382/210, 154, 106
See application file for complete search history.

(56) References Cited

U.S. PATENT DOCUMENTS

| | | | | |
|---|---|---|---|---|
| 5,090,400 A | * | 2/1992 | Saito | ............ 600/108 |
| 5,237,331 A | | 8/1993 | Henderson et al. | |
| 5,353,109 A | | 10/1994 | Langdon et al. | |
| 5,485,009 A | | 1/1996 | Meyzonnetie et al. | |
| 5,610,705 A | * | 3/1997 | Brosnan et al. | ............ 356/28.5 |
| 5,815,250 A | | 9/1998 | Thomson et al. | |
| 6,671,037 B2 | * | 12/2003 | Isogai et al. | ............ 356/4.01 |
| 6,856,396 B2 | | 2/2005 | McGuire | |
| 2002/0088922 A1 | * | 7/2002 | Schmitz et al. | ............ 250/206.1 |
| 2004/0213463 A1 | * | 10/2004 | Morrison | ............ 382/210 |
| 2005/0213075 A1 | * | 9/2005 | Cooke | ............ 356/28 |
| 2008/0007722 A1 | * | 1/2008 | Golab et al. | ............ 356/139.09 |

OTHER PUBLICATIONS

Hogenboom, D.O. and Dimarzio, C.A., Quadrature detection of a Doppler signal, Applied Optics 37, 2569 (1998).
Yuen H.P. and V.W. S. Chan, Noise in Homodyne and Heterodyne Detection, Opt. Lett. 8, pp. 177-1983.
Marino et al., Laser Radar Technology and Applications VIII, p. 1, SPIE Proc. 5086, 2003.
Halmos, Laser Radar Technology and Applications VIII, p. 70, SPIE Proc. 5086, 2003.

* cited by examiner

*Primary Examiner*—Thomas H Tarcza
*Assistant Examiner*—Timothy A Brainard
(74) *Attorney, Agent, or Firm*—McDermott Will & Emery LLP

(57) ABSTRACT

A system for observing a field of view including a light transmitter and a light detector. A path is defined between the transmitter and the detector. The light transmitter generates substantially coherent light onto a transmit portion of a light path and the light detector is positioned in a receive portion of the light path defined by reflected light from some of the target locations. The system includes a component for configuring at least a portion of the light path such that a subset of the plurality of potential target points are included in the light path.

32 Claims, 11 Drawing Sheets

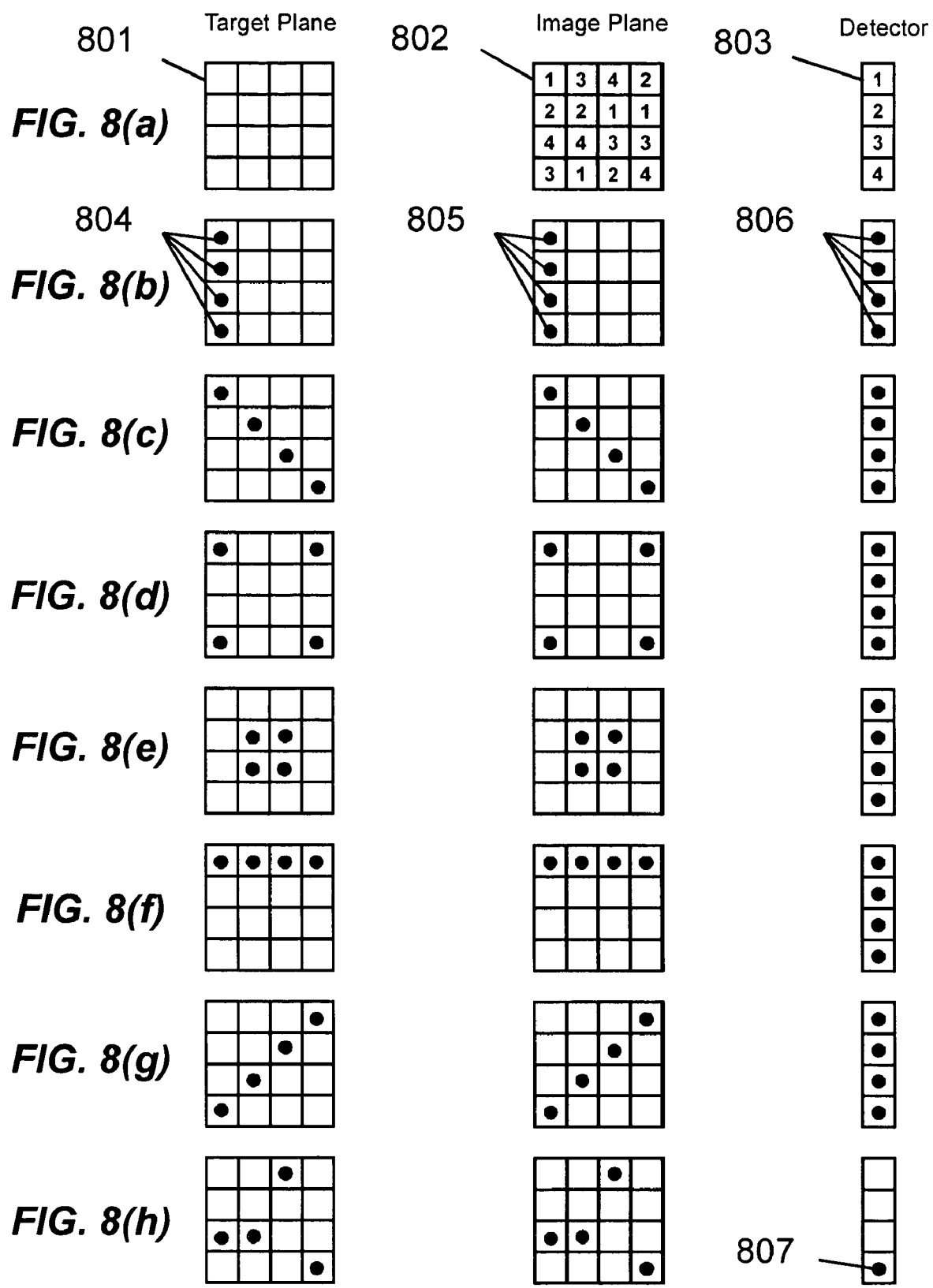

EFFICIENT LIDAR WITH FLEXIBLE TARGET INTERROGATION PATTERN

BACKGROUND OF THE INVENTION

1. Field of the Invention

The present invention relates, in general, to laser radar, and, more particularly, to devices, systems and methods for measuring properties of multiple remote targets. Measured properties include one or more including position, range, velocity, reflectivity, polarization texture, or vibration.

2. Relevant Background

Most conventional lidar (light detection and ranging) and ladar (laser detection and ranging) sensor systems use a single laser beam to reflect off a remote target. Properties of the reflected light, detected at the sensor location, are used to extract information about the target. In the case of detecting range, time of flight ranging is commonly used, wherein the time taken for a short light pulse to travel to the target and back is measured. By detecting the state of polarization (SOP) of the reflected light compared to the transmitted light it is possible to extract information about man-made versus natural targets. Similar information may be obtained by measuring the reflectivity of the target compared with the surroundings. Velocity and vibration information can be obtained by detecting shifts in the radial (along the laser beam) position of the target with time, or through the use of Doppler frequency measurements. Such measurements are described, for example, in U.S. Pat. No. 5,237,331 to Henderson et al. and U.S. Pat. No. 5,815,250 to Thomson et al. which are incorporated herein by reference.

It is frequently desired to interrogate more than one point location in a field of view (FOV). This is useful in order to differentiate between desired target locations and the surrounding scene, as well as to conduct searches over a FOV for targets that have characteristics of interest for identification and/or classification purposes. It is therefore of interest to image a FOV or parts of a FOV by interrogating multiple points. Early generations of imaging systems utilized mechanical scanners to direct a single beam in such a manner that an image could be 'painted', for example by moving the beam in a raster pattern across a scene. Disadvantages of this approach include: rapid scanning is difficult to do quickly, especially if the transmitted beams are large, since the required mechanical hardware becomes heavy and large; mechanical scanners are subject to wear and reliability concerns; it is difficult to maneuver scans in arbitrary patterns rapidly; and it may be time consuming to scan a large FOV. The latter is a particular concern if the scene is changing rapidly or if the laser radar platform is moving rapidly, such as is often the case with laser radar systems mounted to aircraft that scan the ground. Moreover, collecting and analyzing the large amounts of data that can result from interrogating multiple points in a large scene is problematic.

To remedy this situation a great deal of effort has been directed to two areas. One is the development of non-mechanical scanning (NMS) techniques. These include micro-electro-mechanical (MEMS) devices, liquid crystals, and acousto-optic devices. It is noted that NMS techniques may solve some problems, for example less bulk and higher reliability, but they do not by themselves solve the problem of collecting data from a large scene rapidly and efficiently.

The second development area is directed at systems that collect data from numerous regularly spaced points in the FOV simultaneously. These are usually referred to as 'flash' imaging systems and operate similar to a conventional camera in that they collect a whole image at one time using detector arrays. Examples of such systems include publications by Marino et al. (pp.1 in Laser Radar Technology and Applications VIII, SPIE Proc. 5086, 2003) and Halmos (ibid. pp.70) which are incorporated herein by reference. Further examples are given by Landon in U.S. Pat. No. 5,353,109 where multiple beams are generated using a static diffractive device (Dammann gratings and holograms noted by the inventor) and also a system described in U.S. Pat. No. 5,610,705 to Brosnan and Komine which are incorporated herein by reference. By combining NMS techniques with flash imaging it is possible to relatively rapidly collect data from a large scene and to also point the 'camera' in the desired direction without the use of large and heavy mechanical means.

One problem with these prior approaches is that they do not provide sufficient flexibility to always be useful. In considering a general FOV it is often the case that most of the scene contains little or no information of interest. For example, a scene may contain several vehicles against a background filled with natural features. In this case one is typically interested in interrogating details of the vehicles, not the background. Illuminating the whole scene with light can then be extremely wasteful. For example, if the targets of interest only occupy 1% of the FOV then 99% of the illumination may be wasted. Not only is this wasting laser power in illumination, it also means that the electronics signal processor is spending much of its time performing calculations that are of no interest. Compounding the problem is that many lidar systems, especially those on board aircraft, have very limited electrical power and/or computational resources available. It is imperative that power usage be as efficient as possible in order to minimize the amount of illumination light that has to be provided. This in turn minimizes size, weight, cooling requirements, and system cost, as well as maximizing reliability by minimizing the number of system components.

A second problem with conventional approaches arises where the system uses coherent (e.g. heterodyne or homodyne) detection. In such cases a local oscillator (LO) laser beam is aligned carefully in position and angle with the return signal. Such alignment requirements normally account for a significant portion of the cost associated with designing coherent laser radar systems, even when only one LO beam has to be aligned properly. Scaling coherent imaging systems from a single pixel to, for example, imaging a FOV comprising $1,000 \times 1,000 = 10^6$ pixels requires providing LO beams for each pixel, which can become extremely complex. Furthermore, requiring that a local oscillator laser's power be divided to provide power to such large pixel counts can also put extraordinary demands on the LO laser, in order that sufficient power is provided on each pixel to achieve shot-noise limited detection sensitivity. The latter is highly desired to maximize detection of weak return signals from the target. In cases where the FOV contains mostly background information of relatively little interest, the system design would be considerably enhanced if only a selected subset of pixels were addressed.

A third problem may arise in the case of coherent lidar and is caused by the time delay between sending light to a target and receiving scattered light back. Since the speed of light in air is approximately 300,000 km/s, the round trip time is 67 μs for every 10 km distance to the target. Systems of this type are frequently operated in pulsed mode where short laser pulses are sent to the target. If the pulse spacing (inverse of the pulse repetition frequency or "PRF") of the transmitter is shorter than the time taken for light from the previous pulse to return, for sufficiently distant targets a scanner may redirect the system to send a pulse in a different direction before the previous pulse is received back. Unless this is compensated for, the system will not be properly aligned and the detection efficiency will degrade considerably. A very similar problem arises from rapidly moving platforms, where the viewing angle may change rapidly, or for rapidly scanned systems, and is generally referred to as the 'lag-angle' problem. Even small angular misalignments between the transmitted and received beam paths, due to time lags between transmission and reception, cause degradation of the detection efficiency. If the scanning motion (or relative angular motion between the target and the system platform) is relatively constant, this can be compensated with through the use of fixed 'lag-angle compensators'. An alternative method has been disclosed by Welch in U.S. Pat. No. 4,515,472 which are incorporated herein by reference. In the Welch method an array of local oscillator beams is generated to correspond to a variety of anticipated lag angles. In operation the intent is to ensure that even if the lag-angle is a priori unknown, the receive beam will match up with one of the generated LO beams and therefore detection can take place. A similar method has been disclosed by Meyzonnetie in U.S. Pat. No. 5,485,009 which are incorporated herein by reference. These approaches may have some use, but they do not solve the general problem of maximizing efficiency. If a large number of target points is illuminated and a large set of LO beams has to be generated for each pixel, the LO generation problem may become worse, rather than better.

A fourth problem that relates to the previously noted problems is that the volume of data may become difficult, impractical, or even impossible to process. For example, if a detector array has even 10,000 pixels (such as a 100×100 element array) and each pixel is sampled at, for example, 1 gigasamples per second (Gs/s), then the total data rate is 10 terasamples per second (Ts/s). This is not only difficult to process, it is also difficult to transfer from a detector chip to the processor and would likely lead to the construction of electronics that are far more complex, expensive, and bulky than desired. In cases where only a small fraction of the pixels carry information of interest, it becomes clear that this approach is inefficient. Much current effort is geared towards incorporation of pre-processing functionality into the detector/receiver arrays to reduce the computational loads on processors. In these implementations each detector pixel is coupled with a small electronics cell that performs desired pre-processing functions, such as amplification, filtering, thresholding, and the like.

One approach to the data reduction problem is to incorporate threshold detection into the electronics, such that only pixels that detect signals above some threshold would transfer the data out for further processing. In some circumstances this may work, but in other cases it does not. For example, coherent laser radar systems are typically purposely designed to operate in such a manner that only very weak signals are received, e.g. with receiver carrier-to-noise (CNR) levels near unity or even far less. The same situation is also true in many continuous-wave (CW) modulated cases. Signal recovery in these cases does not rely on a high instantaneous CNR but rather rely on the total signal collected over a predetermined measurement time. Since the CNR is so low, simple instantaneous intensity thresholding does not work and hence the approach of building thresholding circuitry into the receiver at the pixel level fails.

It should be noted that the detector arrays do not generally sample continuously at rates on the order of gigasamples/s so total data rates in the Tb/s range generally refers to input burst rates. The average data rates may be significantly smaller yet the impact of receiving signals at very high rates nevertheless has a considerable impact on the design of the detector and receiver because the data is collected and stored at high speed even if it is transferred for post-processing at lower rates.

SUMMARY OF THE INVENTION

Briefly stated, the present invention involves systems for observing a field of view including a transmitter and a detector. A path (e.g., a light path or electromagnetic energy path) is defined between the transmitter and the detector. The transmitter generates electromagnetic energy (e.g., energy ranging in a spectral range from infrared to extreme ultraviolet) onto a transmit portion of the path and the detector is positioned in a receive portion of the path defined by reflected electromagnetic energy from some of the target locations. The system includes a component for configuring at least a portion of the path such that a subset of the plurality of potential target points are included in the path.

BRIEF DESCRIPTION OF THE DRAWINGS

FIG. 8 shows an example of using a fixed receive BFE to map variable target illumination patterns to a fixed small detector array.

DETAILED DESCRIPTION OF THE PREFERRED EMBODIMENTS

The present invention is illustrated and described in terms of lidar systems that incorporate a light transmitter such as a laser as the transmitter. However, it is also recognized that non-laser sources may advantageously utilize the described invention with suitable adaptations. As used herein, the term "light" means electromagnetic energy in a spectral range from far infrared (IR) to extreme ultraviolet (UV). Many of the specific examples use coherent electromagnetic energy sources, however, the degree of coherency may be selected to meet the needs of a particular application. Substantially coherent transmitters include single frequency or monochromatic sources as well as narrow bandwidth and broadband lasers, sometimes referred to as "incoherent lasers". In order to properly understand the invention a brief description of single pixel lidar configurations and conventional imaging lidar systems is provided.

1. Single-Pixel Lidar Configurations

Lidar systems can be divided into two top-level cases. In the first case ("bistatic") separate optics are used to transmit light and receive light. The advantage is that very good isolation between the two paths can be achieved so that little transmitted light is inadvertently scattered from e.g. imperfections in optics to the detector. Bistatic configurations, however, place high demands on relative alignment of the two paths and may require that at least one of the two paths can be realigned dynamically in order to compensate for target planes at varying distances (ranges) from the lidar.

Figure 1:
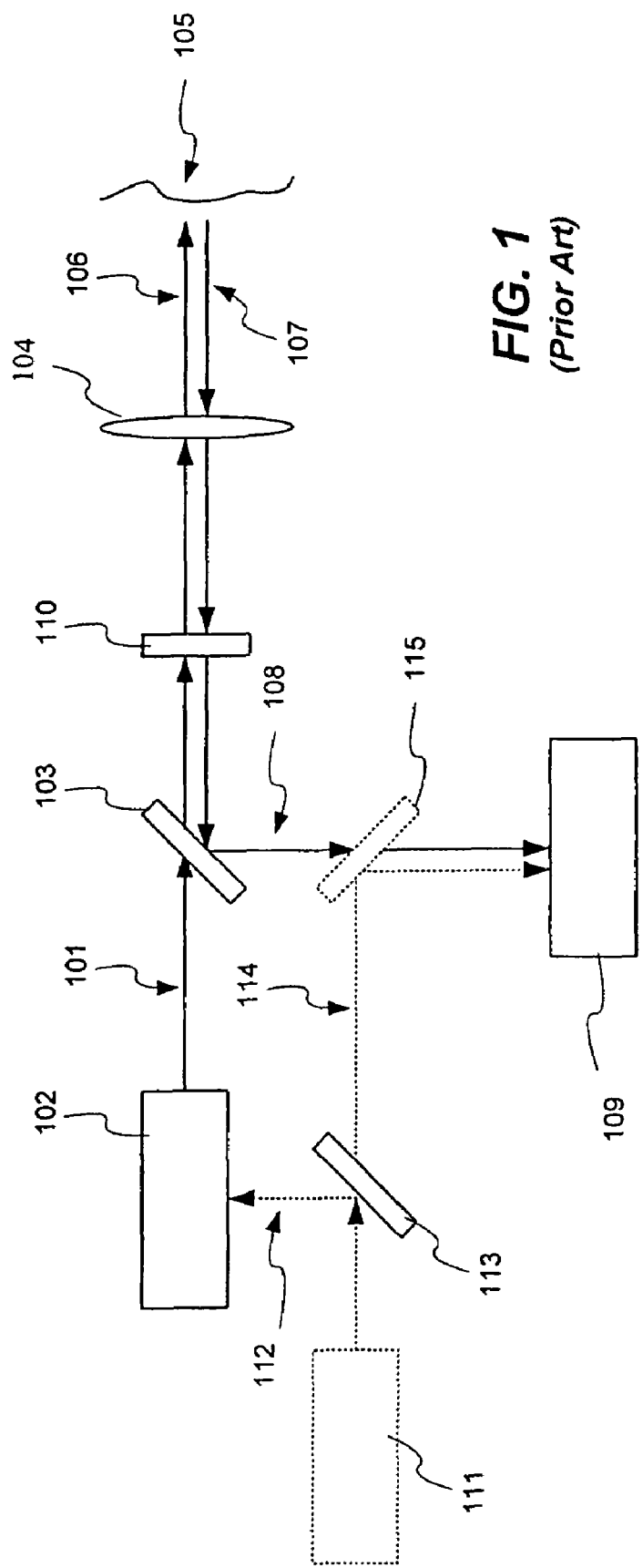
FIG. 1 shows a lidar architecture according to prior art.

In the second ("monostatic") case the two paths are coincident and an optic, such as a beamsplitter or polarizer, is inserted to separate received light from transmitted light. Faraday isolators can also be used and in the case of pulsed transmitters temporal multiplexing to separate the transmit from the received light can be used. For illustration purposes, this is illustrated in FIG. 1 for the simple case of a single beam and using a polarizing beamsplitter and quarter-wave plate for separation of the transmitted and the received light. Here a transmit beam 101 is sent from a transmitter laser 102 through a beam splitter 103 and through the transmit optics 104 to the target 105 along path 106. Scattered light 107 is received by the same optic 104 and is reflected from beam splitter 103 along path 108 to detector 109. In many practical cases polarization techniques are used to achieve a high efficiency in this path separation. It is common that the transmitter laser is linearly polarized and that a quarter-wave plate (QWP) 110 is inserted into the optical path 101. If the beam splitter 103 is a polarizing beam splitter (PBS), light transmission and reflection efficiencies of the transmitted and received beams of substantially 100% can be achieved assuming that the target reflection does not significantly depolarize the light. For example, when a polarizer is used as shown in the figure, light transmitted through QWP to the target is then circularly polarized. Upon reflection from the target, circularly polarized light with the opposite handedness becomes polarized at 90 degrees to the transmit light upon transmission through the QWP. Because of the polarization sensitive nature of PBS 103 the received light is now reflected to the detector with very high efficiency.

The laser radar configuration described is referred to as direct detection (DD) because the detector detects photons scattered from the target onto the detector surface. An alternative system is referred to as coherent detection (CD) lidar, which adds the means to optically mix the return signal with other light which is then incident on the detector. A simple example illustration a configuration that allows this is shown in FIG. 1 with the added elements shown as dashed lines. In the CD case a master oscillator (MO) laser 111 is typically used to produce a stable frequency reference. One laser beam 112 from MO 111 is split off using beam splitter 113 and is used to set the frequency of transmitter laser 102 with a splitting ratio determined by the specifics design parameters of the system. The second part of the laser beam 114 is reflected from beam splitter 115 in such a manner that the reflected beam and the part of beam 108 that is also transmitted through beam splitter 115 optically mix to form a common beam 116 that is then incident on detector 109. The splitting ratio of beam splitter 115 is also determined by the specific system but may be designed such that 5-10% of MO beam (referred to at this stage in the system as the local oscillator or LO beam) is reflected and 85-90% of the signal beam 108 is transmitted towards the detector. Care is taken to ensure that the two beams overlap spatially and in propagation direction following mixing, and that they have the substantially the same polarization. This detection configuration is referred to as homodyne. If a frequency shift is introduced between the beams 114 and 108 the configuration is known as heterodyne.

Unless explicitly noted the implementations discussed herein refers to either direct detection or coherent detection, the latter case incorporating both homodyne and heterodyne. It is further noted that other detection configurations exists, such as autodyne detection whereby a portion of the received signal itself is used as the local oscillator, that may be incorporated with suitable modifications. Polarization/depolarization measurements can also be carried out by incorporating two or more detectors or detector arrays. Optical quadrature detection as disclosed by for example Hogenboom, D. O. and diMarzio, C. A. ("Quadrature detection of a Doppler signal", Applied Optics 37, 2569 (1998)) may also be incorporated in the coherent detection case, as can balanced receivers as discussed for example in "Noise in homodyne and heterodyne detection," Yuen H. P. and V. W. S. Chan, Opt. Lett. 8, pp. 177, 1983.

Although the specific examples of the present invention described herein relate to monostatic lidar architectures it is contemplated that the disclosed invention applies equally well to and is readily adapted to bistatic lidar architectures with suitable modifications.

2. Imaging Lidar Configurations

Figure 2:
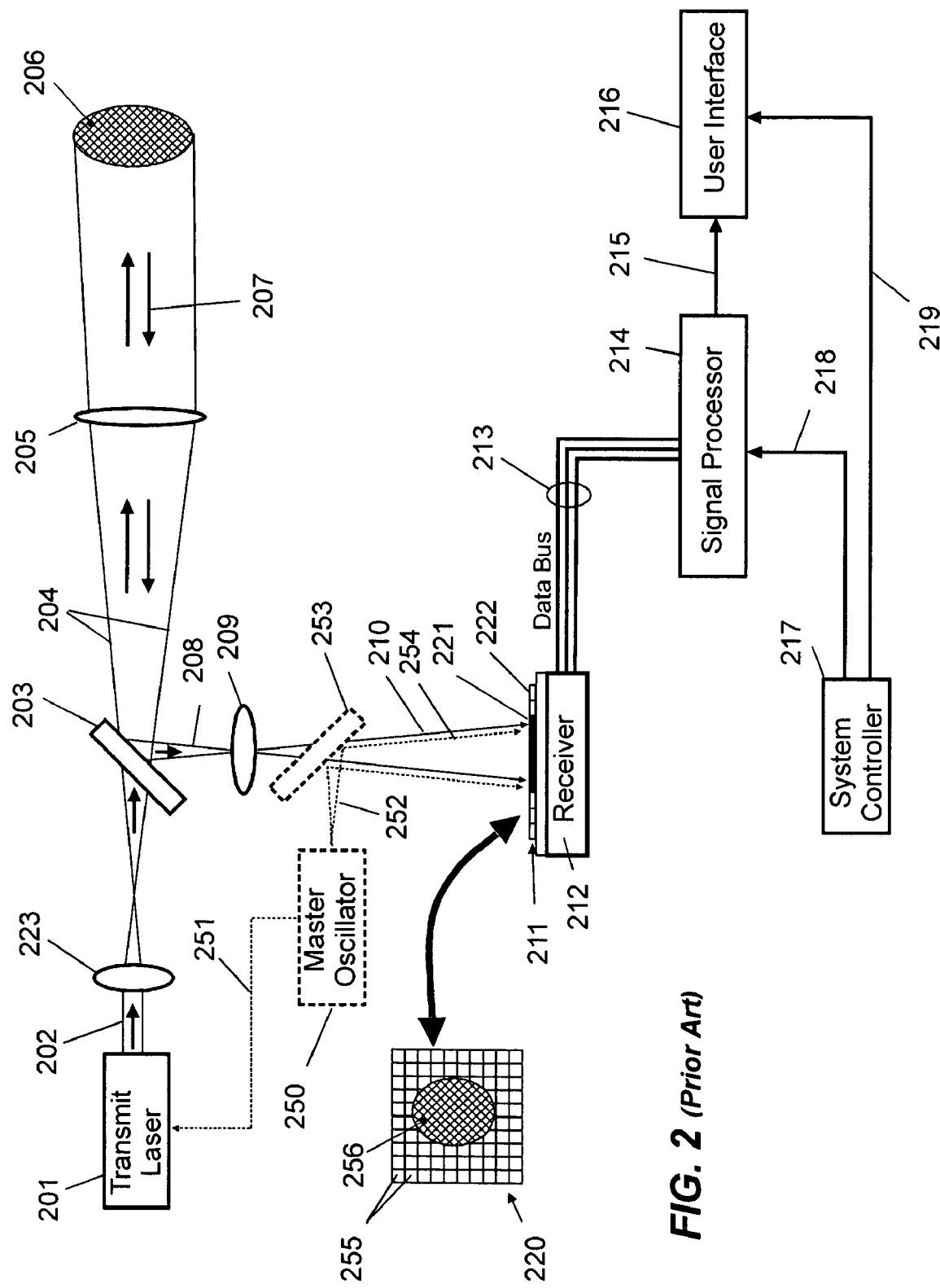
FIG. 2 shows an imaging lidar system according to prior art.

FIG. 2 shows a typical architecture of an imaging lidar system. The architecture contains essentially the same elements as the single pixel case with some important differences. As in FIG. 1, the imaging architecture starts with a transmitter laser 201 that produces a laser beam 202 propagating in the indicated direction. When the system is operated in coherent detection mode there is also normally a master oscillator laser 250, a part 251 of whose laser power is tapped off and used to set the frequency of transmitter laser 201. Optical components 223 and 205 are used to form an extended illumination area 206 at the target. The transverse extent of the transmitted beam is indicated by lines 204. Optical element 223 is shown as a lens whose purpose is to ensure that when used in conjunction with optical system 205 the desired illumination is produced. There is also shown a splitting element 203, such as a polarizer, that is used to separate transmitted light from received light. In order to effect this polarization separation a quarter-wave plate (not shown) is inserted between components 203 and 205. This element has been omitted for clarity.

Light scattered from illuminated area 206 returns in direction 207 back through optical system 205, is reflected from element 203, and propagates as beam 208 to detector array 211. Also shown is an optical element 209 that may be inserted into the path of beam 208. The function of this element, in conjunction with optical system 205, is to form an image of target 206 onto the surface of detector array 211 with a magnification generally such that the image of the fully illuminated target area approximately fills the area of the detector array 211. Detector array 211 is connected to receiver 212, which comprises suitable electronics components to amplify and filter the detector signals, and may also incorporate other suitable pre-processing functions. As noted in the introduction the degree of complexity of such electronics is normally very low for high pixel count arrays. One reason for this is that each pixel element may only measure on the order of 100 micrometers squared, or significantly less, so there is generally very limited space available for electronics behind each pixel element. Data from the receiver is sent on a data bus 213 to signal processor 214, which carries out processing of the signals to extract desired information about the target. Typically such processed data is then passed to a user interface 216 as indicated by line 215. Most lidar systems would also incorporate a system controller unit 217 that communicates with signal processor 214 and user interface 215, as indicated by lines 218 and 219. Additional subsystems are not explicitly shown but are also normally incorporated into lidar systems of this type, including laser drivers, timing circuitry, temperature controllers, and the like. Also shown in FIG. 2 for completeness is a front view 220 of the detector array 211. It shows a grid of individual detector pixels 255 with an image 256 of the target 206 superimposed.

For conventional intensity imaging the configuration shown in FIG. 2 can work well, because the technology to make large arrays (for example 1000×1000 pixels) is well established. Digital cameras with >1 million pixels are available today as essentially commodity items. However, such large pixel counts are possible in part because the electronics associated with each pixel is very simple and readout rates are very low. Conventional digital cameras essentially integrate the number of photons received at each pixel location and form an intensity image. A large pixel count is acceptable because the frame rate can be very low, for example 30-60 Hz, or much less, for still cameras. Performing more complex processing of information from each pixel for such large arrays can become extremely difficult as noted above. Since conventional lidar systems process data at far higher rates that conventional imaging systems it is generally difficult and expensive to scale the illustrated architecture to high pixel counts.

3. Embodiments of the Invention

The present invention encompasses an integration of Beam Forming Elements (BFEs) into the transmit and/or receive paths of an imaging lidar transceiver as well as detector/receiver arrays and data management functionalities that permit the laser radar system to perform multi-pixel measurements in a laser power efficient and computationally efficient manner. Depending upon the desire to carry out specific imaging functions, the BFEs may take several forms, as follows:

Fixed passive elements are elements that do not need electrical and other input in order to perform their function, such as generating multiple beams or redirecting beams from one location to another. Examples of passive elements include refractive, diffractive, and reflective devices such as micro-prism arrays, diffractive optical elements (DOE), mirror arrays, holograms, and the like.

Switchable passive elements refer to assemblies of passive devices that can be inserted or removed from a system with operator assistance or using e.g. mechanical means. An example would be a set of DOEs used to generate different diffractive beam patterns and mounted to a turret such that a preselected element can be inserted into a transmit or receive path in the lidar by an operator or remotely by a computer.

Active elements refer to devices whose operation on a beam is controlled e.g. electrically. Examples of active devices include sets of discrete mirror arrays (for example of the type used in telecommunications cross-bar switches), deformable mirrors, diffractive MEMS devices, liquid crystal arrays, electro-optic devices, and the like.

Incorporation of a BFE in a lidar transmit path permits programmable illumination of a target plane in a highly flexible manner. Examples of illumination patterns include: regular lines, grids, or areas of illuminated spots; irregular distributions of illuminated spots; and flood illumination of predetermined areas within the field-of-view (FOV). The chief requirement on the transmit BFE is that it provides the desired illumination pattern without significant degradation of the transmitted beam. It is generally desired that the BFE not alter, except in a desired way, the polarization state of the incident beam, that it does not alter the frequency of the transmitted beam in an uncontrollable manner, that it does not significantly degrade wavefront quality in an uncontrollable manner, and that the efficiency is high (low insertion loss). For example, if it is desired to produce 10 illumination spots at a target, it may be ideally desired that 10% of the incident beam's power is directed at each of the 10 target points. Highly efficient delivery of light distributions with total efficiencies in the range of 50-100% is generally feasible with a number of technologies, such as micro-mirrors and liquid crystal devices.

Incorporation of BFEs in the lidar receiver path permits imaging or mapping selectable portions, points, samples, discrete marker points, or other prescribed features of the illuminated, high resolution target scene onto a fixed and limited size detector array. A key notion is that the target FOV is frequently large in terms of the number of resolvable spots, for example measuring 1000×1000 points (pixels) or more. In a conventional imaging system there is a one-to-one correspondence between target points and detector elements. However, in many situations, including those where heterodyne detection is employed, is it inconvenient and frequently cost-prohibitive, to incorporate such a large number of detector elements. Large detector arrays can be deployed, but it is then advantageous to not process signals received on all elements in order to reduce the bandwidth requirements on the signal processor.

The common purpose of all these devices is to alter one or more characteristics of light incident upon the device. Alterable characteristics include direction, phase, frequency, amplitude, and/or polarization. All such elements will, for simplicity, be referred to as Beam Forming Elements (BFE). The invention improves upon the general system architecture shown in FIG. 2 so it is important to be clear about important features:

A laser is used in conjunction with optical elements to illuminate an area at a target plane with a predetermined spatial distribution of light.

Using the same, or additional optical elements, light scattered from the target plane is collected and transformed such that an image of the target is formed at a plane, which we refer to as the "image plane" or "target image plane" below. In FIG. 2 the detector array is placed at the image plane. An important point is that there is a one-to-one relationship between points at the target and in the image plane. Each small area at the image plane can be treated as a small bundle of light rays that have propagated from the corresponding area at the target, through the receive path imaging system and to the image plane.

At the detector plane, detected photons are converted to electrical signals that are transported to a signal processor for extraction of target information.

A significant issue resolved with the present invention is enabling simultaneous measurements of M flexibly selected target points without requiring reading out data corresponding to substantially more than M pixels. In accordance with the present invention, this can be done using multiple approaches that simultaneously introduce flexibility into at least two of the three essential features noted above. That is, we may flexibly alter the transmission of illumination patterns, we may flexibly make alterations at the target image plane, and/or we may flexibly alter the operation of the system at the detector plane. These three "degrees of freedom"

give rise to a number of possible permutations, or cases, the ones most relevant to this invention being summarized in Table 1 below.

Case 1 is the case of most conventional lidar systems. A single beam is transmitted to the target and scattered light is received on a single detector. This case obviously affords no flexibility in interrogating multiple target points except through the introduction of a scanning system that operates identically on both transmit and receive beams. This is commonly done but suffers from a number of limitations, including lag angle effects when the angular alignment between the target and the receiver changes during the transit time of light to the target and back.

Case 2 incorporates methods, such as those disclosed by Meyzonnetie, that couple a single transmit beam with N detectors to ensure that at least one detector receives the signal. As noted by Meyzonnetie the intent is to use this configuration with a linear detector array to account for unknown amounts of lag angle that may occur in one linear direction. It is consequently poorly suited for tracking unknowns in two dimensions, where N could easily become very large, resulting in a high degree of inefficiency in the use of computational resources.

Case 5 is a conventional imaging case where a fixed set of M illumination beams is generated and imaged back to a set of fixed detectors of equal number. This case makes no provisions for incorporating flexibility.

Case 6 is a variation of case 5 wherein M illumination beams are imaged back onto a large detector array and the entire detector array is read out whether data exists on specific pixels or not. As noted, when N becomes large this approach makes very inefficient use of computational resources.

All other eight cases noted in Table 1 are variations of the present invention that incorporate flexibility into the system by altering at least two essential aspects of the system design as denoted by bold print in Table 1. In each of these cases a flexibility element in the transmit path is coupled with either a receive BFE element to reduce the number of required detectors, and/or with a larger detector array with individually addressable pixel readout.

TABLE 1

| Case | Transmit Pattern | Receive BFE | Detector/Receiver Pixels |
|---|---|---|---|
| 1 | Single point static | No | 1 |
| 2 | Single point static | No | N static |
| 3 | Single point dynamic | No | N addressable |
| 4 | Single point dynamic | Yes | 1 |
| 5 | Fixed M point | No | M pattern matched to transmit |
| 6 | Fixed M point | No | N static |
| 7 | Fixed M point | No | N addressable |
| 8 | Fixed M point | Yes | M |
| 9 | Switchable fixed M | No | N addressable |
| 10 | Switchable fixed M | Yes | M |
| 11 | Dynamic M | No | N addressable |
| 12 | Dynamic M | Yes | M |

Figure 3A:
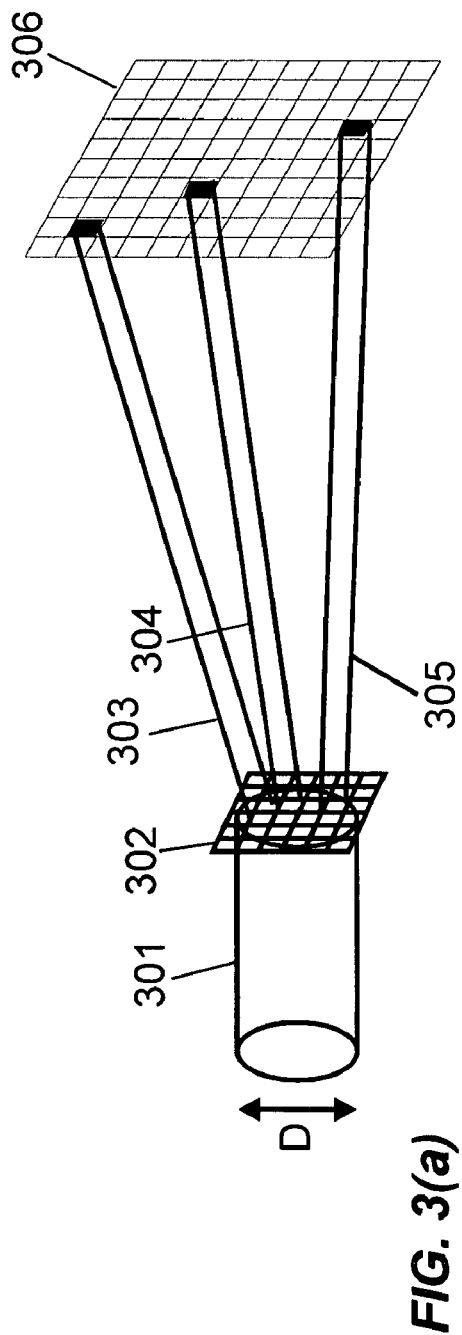
FIG. 3 shows a lidar transmit beam with a transmit BFE that produces multiple illumination points at a target.

In operation a programmable (real-time or preprogrammed) BFE in the transmit path ("transmit BFE") is used to illuminate the scene with a selectable pattern of coherent or incoherent light. The transmit BFE could operate in two fundamentally different manners. FIG. 3a) illustrates a case where the BFE 302 subdivides the transverse extent of the incident laser beam 301, having a diameter D, into 6×6 sub-areas, and where each sub-area is acted upon by a segment of BFE 302. In this example, BFE 302 could generate up to 6×6=36 independently pointing beams, each one intersecting target plane 306 at different points. The target plane 306 is shown as being divided into a grid of rectangles for illustration purposes only. The extent of the full grid is referred to as the field-of-view (FOV) and represents the full extent of locations where transmitted beams may be directed. Although the grid is shown as rectangles for clarity, it is clear that pointing of the beams does not have to be done on the basis of points aligned to a grid. If the input beam diameter D is matched to the size of the BFE device, the transverse extent of each sub-beam would be approximately D/6 in this case. For clarity only three such smaller beams 303-305 are shown. It is obvious that the numbers 6×6 is used only as an example. The number could range from 1 to a large number, such as 100× 100. It is also obvious that this device could be used to redirect the power from all subbeams to a single position at target plane 306.

A number of different devices could be used to implement the BFE, including mirror arrays or diffractive optics, including liquid crystal devices. Although the beam is illustrated as being transmitted through the BFE it is obvious that operation in reflective mode is also possible. This would be the case where one or more sets of mirrors are utilized.

Figure 3B:
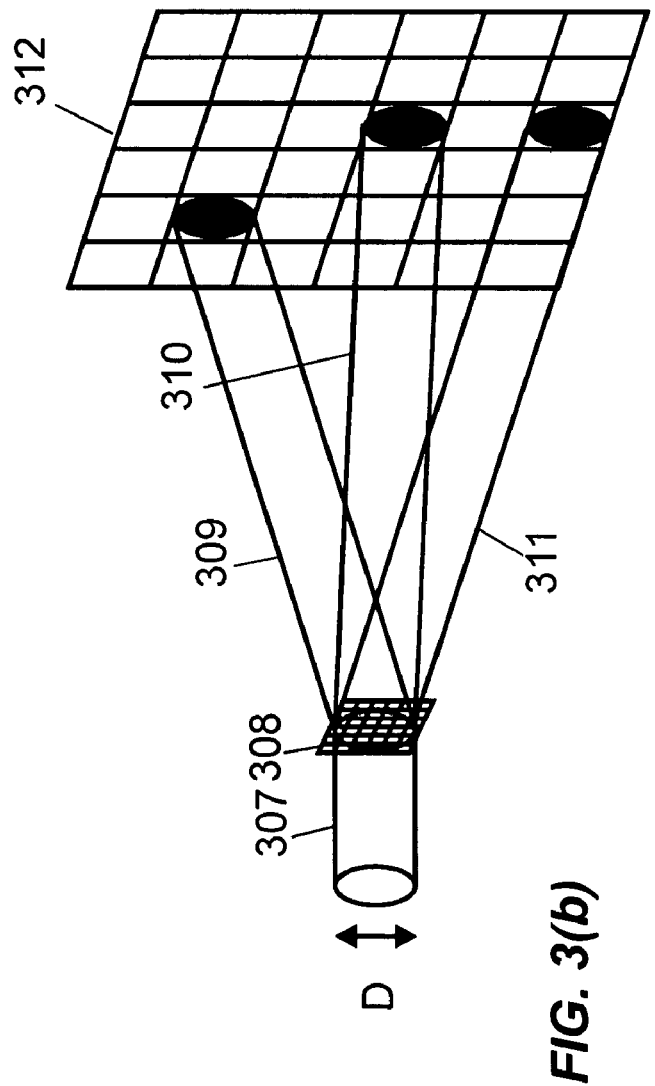

FIG. 3b) illustrates a case where the BFE acts by diffraction effects on the whole incident laser beam in such a manner that the far-field diffraction pattern provides the desired illumination pattern. Here incident laser beam 307 is incident on BFE 308, which acts on the whole beam to generate, by diffraction, several sub-beams 309-311 that produce a distinct illumination pattern at target plane 312. Close to the BFE 308 there is substantially a single beam due to overlap of the generated diffraction beams, but as the beams propagate farther from BFE 308 they separate to provide the desired illumination pattern at target plane 312. Diffractive optical elements of this type can be either static, for example binary optics or gratings, or they could be dynamically addressable devices. Examples of the latter include liquid crystal devices, for example the "512×512 Multi-level/Analog Liquid Crystal Spatial Light Modulator" available form Boulder Nonlinear Systems, or diffractive mirror devices, such as Grating Light Valves from Silicon Light Machines. Both of these specific devices operate in reflection rather than transmission, but implementing a transmissive system is also contemplated.

It is clear that transmit BFE devices incorporate cases where a single beam is generated that may or not be offset in angle from the incident beam. This is done through the insertion of a reflective, refractive, or diffractive device that acts upon the incident beam like a mirror, prism, or diffraction grating.

Optical devices could be disposed of between the transmit BFE (302 or 308) and the target (306 or 312) to improve the functionality of the lidar system. Such devices include lenses, telescopes, or other similar functional elements used for example to produce appropriate magnification of the target illumination pattern. Another class of devices would be scanners that direct the ensemble of transmitted beams generated by the transmit BFE to a target area of interest by changing the propagation angle of the ensemble of beams. A third class of devices may incorporate wavefront sensors and/or compensators that correct the transmitted beams for distortions imposed by atmospheric turbulence, imperfections in optical fabrication, and the like.

In cases where the transmit BFE is dynamically programmable, information available from other sensors, or from the laser radar itself, can be used to ensure that the desired target plane illumination is achieved. For example, information about wavefront distortions caused by atmospheric turbulence can be used to correct for those wavefront errors either through a separate correcting element as noted or the function may be incorporated into the programmable transmit BFE itself.

Figure 4:
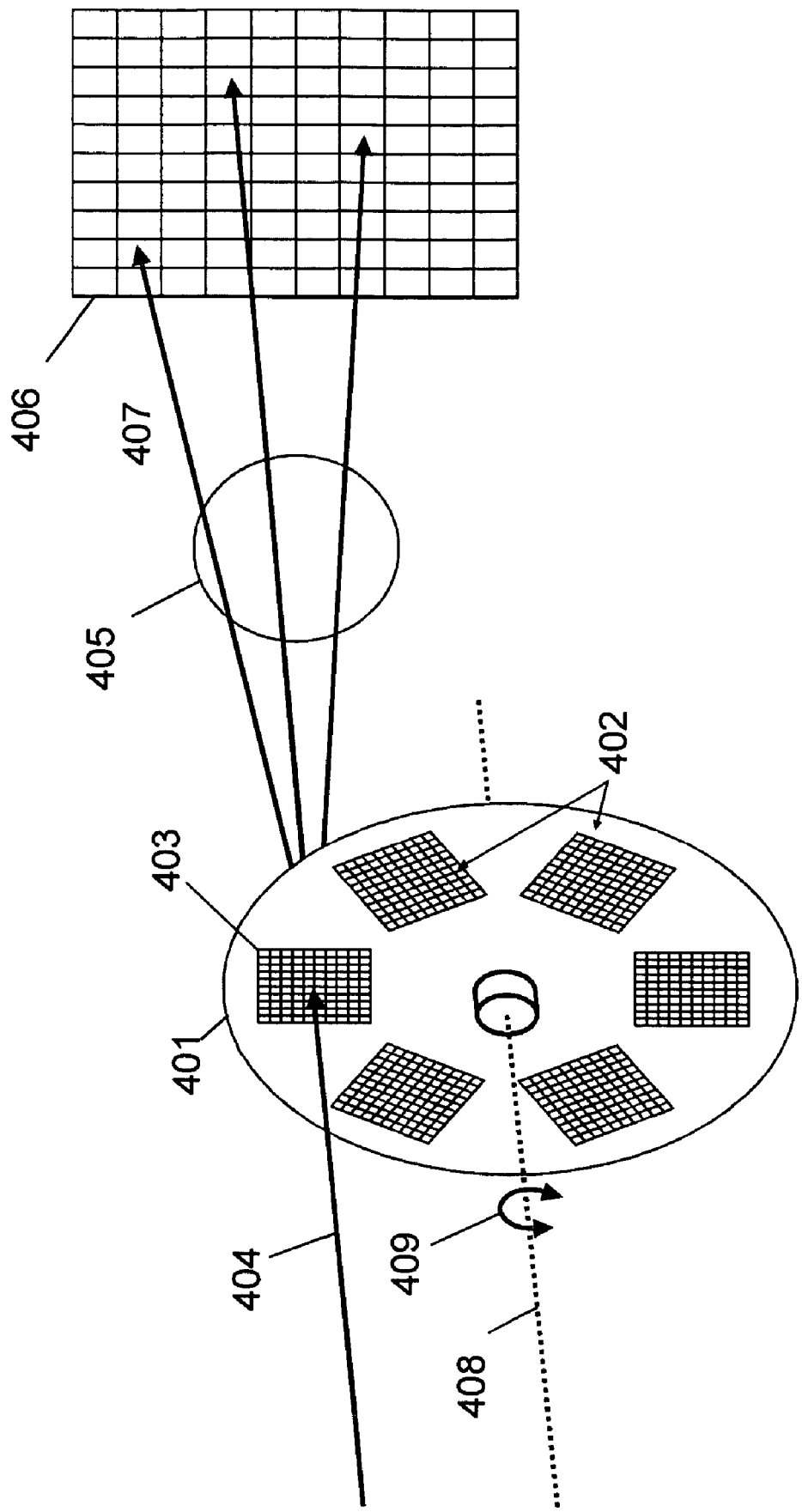
FIG. 4 shows a lidar transmit beam with a switchable fixed transmit BFE to illuminate a target with a switchable pattern of target illumination.

An example of incorporation of a switchable fixed transmit BFE is shown in FIG. 4. In FIG. 4 is shown a disk 401 that holds multiple fixed devices 402 each of which is designed to produce a different beam pattern. These devices are exemplified by previously noted elements 302 and 308. As shown in FIG. 4 device 403 is located such that an incident laser beam 404 is transmitted through device 403 to produce three beams 405 that are incident on a target 406 illustrated as a grid. Disk 401 is also mounted on an axis 408 such that it can be rotated about that axis as shown by curved arrow 409. This permits alternative elements 402 to be rotated into the incident beam 404 in order to produce other beam patterns 405 at target plane 406. Although in this example 6 possible patterns are indicated, there is no specific limitation on the number of elements 402 that are present, nor is there any requirement that they all produce the same number of beams 405, although it is generally desired that the elements do not produce more than M illumination points where M is equal to the number of active detector elements in the system. It may in some cases, as an example, be desirable that one sample element 402 is completely clear to enable all the laser power or energy to be deposited at one target point. The implementation of mounting multiple elements 402 to a rotatable disk in the manner shown is also clearly just an example. Many other possibilities are obvious to those skilled in the art, such as mounting multiple elements linearly like a film strip and using linear translation to affect a switch between elements.

It is also contemplated that a combination of devices can be used to produce desired illumination patterns. For example, it may be desirable to interrogate a 100×100 pixel target plane over a predetermined period of time. One could then, for example, use a fixed diffractive device to generate a set of 10×10 pixels with a sparse pattern where the spacing between the illumination pixels is 10 beam diameters. This diffractive set of beams could then be directed through a dynamic element, for example a liquid crystal device, such that the 10×10 pattern is moved in small increments to fill in the 100×100 pixel field over time.

4. Embodiment of a Flexible Lidar System with Addressable Receiver

Producing arbitrary illumination patterns as described above is one step in producing a flexible imaging lidar system. Used in conjunction with an addressable receiver array this forms the basis for the first implementation of such a system, which we now describe with reference to FIG. 5. The embodiments described in this portion of the specification relate to cases 3, 7, 9, and 11 in Table 1.

Figure 5:
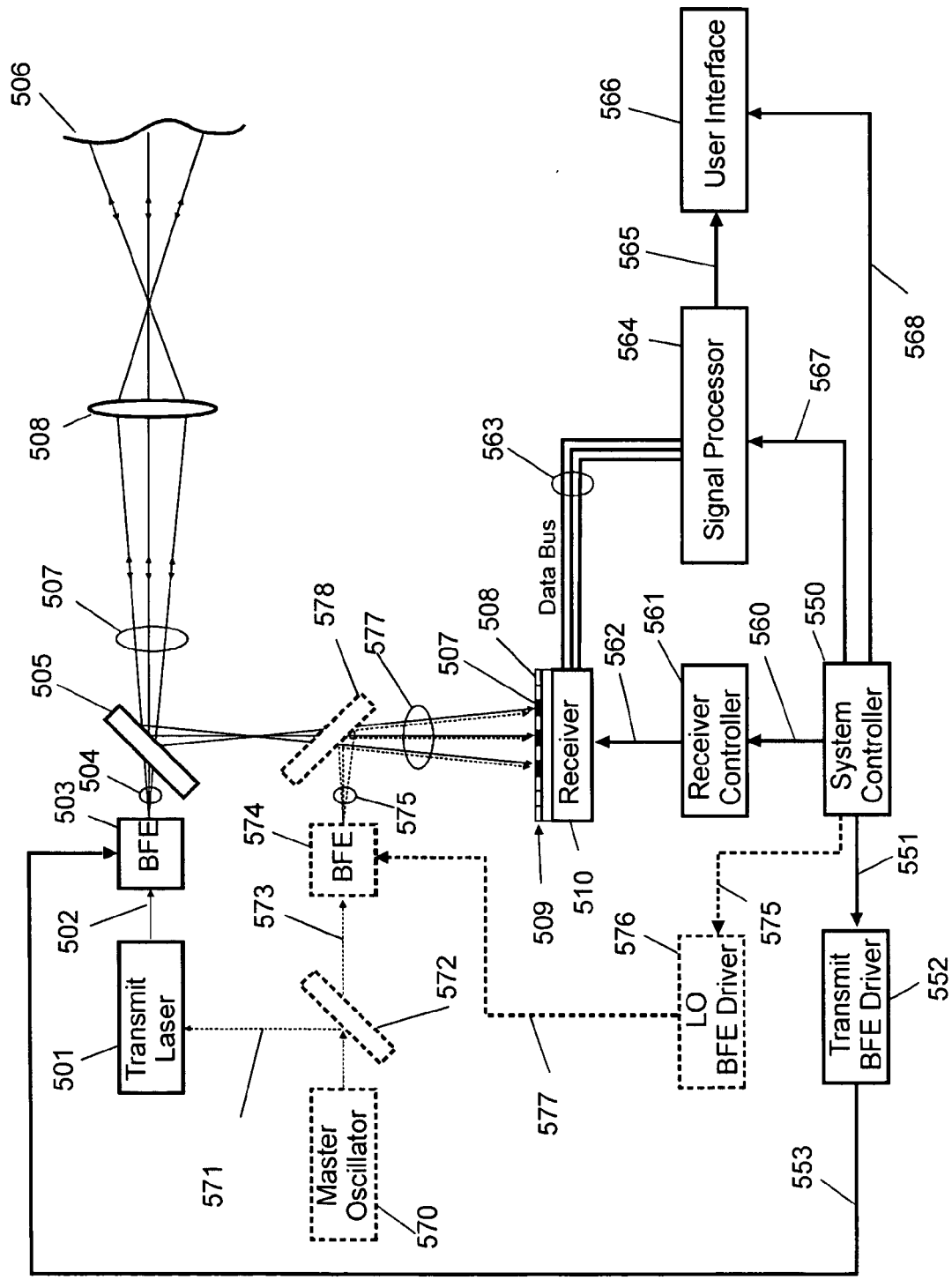
FIG. 5 shows a lidar system with a transmit BFE to produce a flexible target illumination pattern and a large detector/receiver array.

In FIG. 5 is shown a transmit laser 501 that produces a laser beam 502 that propagates to a transmit BFE 503. Operation of BFE 503 is determined by system controller 550 which is used to determine, based on desired use, what illumination pattern should be produced at a target 506. System controller 550 issues appropriate commands 551 to transmit BFE driver 552, which in turn produces drive signals 553 to BFE 503 in order to produce the desired angular distribution of beams, illustrated in this example as 3 beams 504. In the case of a fixed transmit BFE device the BFE driver and associated control signals are absent, whereas in the case of switchable elements (e.g. FIG. 4) the function of the BFE driver and associated control signals are used to control the insertion or removal of BFE elements in the transmit beam. The generated beams 504 propagate through beam splitter or polarizer 505 and are transmitted to illuminate target 506 as beams 507, using optical system 508. Optical system 508 may be a simple lens, a more complex telescope, or any other suitable system that forms the desired illumination pattern at target 506 given an input distribution of beams 504. Optical element 508 may also incorporate beam directing optics for steering of the beam bundle 507, and may also incorporate wavefront sensors to allow measurement of the wavefront of the transmitted or received signals. The wavefront information can then be used to drive the transmit BFE 503 or other adaptive optical elements that can be incorporated into optical element 508

Light scattered from target 506 returns along the same direction, passing again through optical system 508, and is reflected from optical element 505. From optical element 505 the beams propagate to detector array 509 where an image of target 506 is formed. Optical system 508 functions to image the target onto the detector plane. In order to meet for example physical constraints such direct imaging may not be feasible in which case additional optical elements may be required to be inserted into the system. The manner in which this is done is not essential to the understanding of the system and is therefore not described in detail, except to note that it is desired that the optical imaging systems used approximately match the size of the target image to the size of the active part of the detector array. Such additional optical elements may take the form of, for example, lenses disposed between elements 505 and 578 to produce the desired effect.

A key issue is that in this system only a subset of detector pixels receive light scattered from the target. The system may be designed, as an example, such that the transmit BFE can be used to address N possible locations at the target plane (where N may be for example 1000×1000 pixels), but that only a much smaller number of beams M is generated by BFE 503, for example M=100. In such a case only a limited number of pixels at detector 509 receive scattered light. Such pixels 507 are indicated by filled rectangles in FIG. 5, while unused pixels are indicated by unfilled rectangles 508.

In order to achieve the benefit of efficient use of processing capabilities a further essential element of the embodiment of the invention is the way in which data is selected for transmission to the signal processor. The system controller 550 controls the distribution of illumination at the target 506 as noted. As a result it is also known which pixels in the detector array will receive scattered light. Consequently it is only necessary to read out data from those active pixels and ignore the rest. To meet this requirement the system consequently contains a receiver controller 561 that receives input information on line 560 from system controller 550 as to which pixels are valid at any given time. The receiver controller 561 in turn enables data output from only those pixels in receiver 510 that contain valid data. That data is transported on a data bus 563 to signal processor 564 for extraction of target information. Processed information can then be further output on line 565 to a user interface 563. In order for the signal processor 564 and/or user interface 566 to reconstruct images properly it is also desired to interface those units to the system controller 550 as shown by lines 567 and 568. This novel manner of operating an imaging lidar system has the clear benefits stated at the outset. In particular it is noted that the data rate reduction can be extremely high. For example, if the target plane contains N=1000×1000=1 million addressable points the detector array would have a substantially similar number of detector elements. But at any given time there may only be, for example, M=100 actual illuminated points at the target plane, in which this operating mode reduces the amount of data by a factor of 10,000.

The agile imaging lidar is useful for direct detection measurements. The system can also be configured for coherent detection measurements by adding the elements shown in dashed lines in a manner similar to what was described in the context of FIG. 6 above. As previously described a master oscillator 570 is added to provide a frequency reference. The laser beam from MO 570 is split using beam splitter 573 into beam 571 that is used to set the frequency of the transmit laser, and beam 573 that is used to form the LO beam. In contrast to the single pixel case of FIG. 6, a local oscillator BFE (LOBFE) 574 is added. This LOBFE receives a drive signal 577 from a driver unit 576, which in turn receives signals 575 from the system controller 550. The purpose of the LOBFE 574 is to generate a set of local oscillator beams 575 that, when optically mixed with the return signal beams at beam splitter 578, create the coherent mixing beams 577 required for homodyne or heterodyne detection at detector 509.

In many cases the angular beam pattern generated by LOBFE 574 may be essentially identical to that generated by transmit BFE 503, however it need not be. One case where the two patterns may differ is where lag effects, due to angular changes in the line of sight between the lidar and the target as a result of relative motion between the lidar and the target during the time of flight, causes a lateral shift between the received signal pattern and the generated LO illumination in the detector surface. If the relative motion is known the LOBFE can be used in a compensating manner to deliberately shift the LO beam pattern to match the received beam pattern. A second case where the patterns may differ is when there is a sufficient time lag between transmission of target illumination and reception that the transmit BFE has altered the transmit pattern by the time the previously transmitted light is received. A third case occurs when one of the BFEs is additionally used to compensate for optical distortions due to e.g. refractive turbulence or imperfections in optics. In such cases the transmitted beams 504 or the local oscillator beams 575 may be deliberately pre-distorted to compensate for distortions imposed as the light propagates. With liquid crystal arrays, as an example, it is a simple matter to add essentially arbitrary phase variations across the cross-section of a beam. Such phase variations can then be added to the already present phase variations used to generate desired beam patterns.

It is further important to note that there need not be an exact one-to-one relationship between the number of beams generated and the number of active pixels in the detector array. In some cases received light from a single illumination beam may image onto several adjacent detector pixels, for example a 2×2 sub-array centered on the desired pixel. In such a case the receiver controller would enable data readout from all such sub-arrays. In the coherent detection case the LOBFE would obviously also be directed to generate local oscillator beams that cover the same pixels that are covered by the received signal beams. A possible need to read out data from, for example, 4 adjacent pixels rather than just one, does not strongly compromise the gains in data reduction afforded by this approach. Using the example above of having $10^6$ addressable points but only 100 illuminated spots, if each illuminated point maps to 4 pixels instead of one the data reduction rate is still a factor of 2,500 compared with the case of reading out all pixels.

It is also apparent to those skilled in the art that in some coherent detection cases it may be advantageous to simply illuminate the whole array with local oscillator light, particularly if sufficient amounts of LO power is readily available or if the array is not excessively large. The tradeoff is that a greater amount of LO power is required, but uniform illumination also obviates the need for the LOBFE. Detector heating may be a concern with large amounts of LO power, but this problem may be reduced or eliminated by switching the LO illumination on only during those time intervals when signals are anticipated to be present.

Although primarily discussed in the context of coupling a pixel addressable detector/receiver array with multiple transmit beams, it is important to note that the invention has very substantial benefits even in the case of using only a single transmitted beam (Case 3 in Table 1). In operational scenarios where, at a given time t, there is a significant angular difference between the laser beam being sent out at time t, compared with light received as a result of light transmission at an earlier time $t-t_0$, a single element detector could be looking in the wrong direction when the earlier light returns. By having a large array of pixels available the system controller could compensate for the time lag effect and direct the receiver controller to read out the appropriate pixel. This is fundamentally different from prior solutions where multiple pixels are always read out based on the lack of information about which pixel would receive valid signal light. In the disclosed case the correct pixel is known, which enables the system to conserve computational resources by only processing a single pixel, or perhaps a very small sub-array as noted above.

5. Implementation of Receiver BFEs

A number of further advances in the construction of lidar systems can be obtained through the incorporation of BFEs in the receive part of the system. These implementations permit covering cases 4, 8, 10, and 12 in Table 1 above. The essential idea is that, as an alternative to building a large detector array with possible preprocessing capability at each pixel location and then not using but a small fraction of the pixels at any given time, it is often more efficient to employ BFEs in the receive path for the purpose of redirecting received beams to predetermined detector pixel positions. The general idea then is to configure a lidar system in such a manner that a transmit BFE is used to illuminate M points at a target plane containing a potentially much larger number N of addressable points, and use one or more BFEs in the receive path to redirect scattered light from those M points to a substantially similar number of detector pixels. In this manner it is possible to construct an imaging lidar that transmits for example M=100 beams to a predetermined 100 points out of a possible, for example, $N=10^6$ addressable points, and to receive all the light using a detector array containing only M=100 elements. The starting point for implementing receive BFEs is consequently the notion discussed in conjunction with FIG. 2, that each point or small area at the target image plane can be viewed as a small bundle of light that has propagated from the target back through the receive system. Instead of placing a large detector array at the image plane we instead place there a BFE element that redirects such bundles of light (beams) towards a smaller detector array.

6. Receive BFE Embodiment

Figure 6:
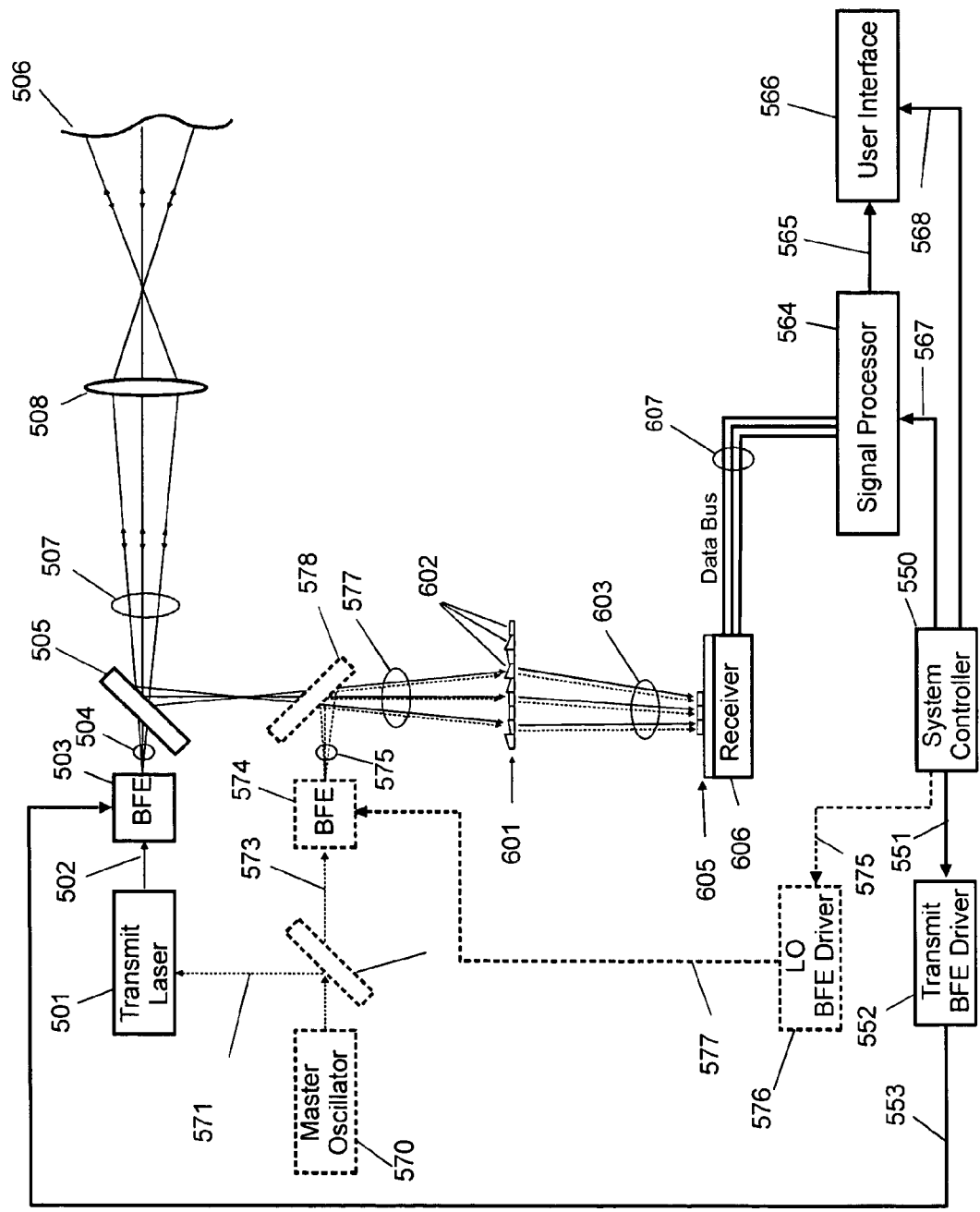
FIG. 6 shows a lidar system incorporating a transmit BFE and a receive BFE for efficient direction of received light to a smaller detector/receiver array.

In the first embodiment of the invention to incorporate a BFE in the receive path, the receive BFE consists of a set of elements that redirect each image point to a separate detector element as shown in FIG. 6. FIG. 6 has many elements in common with FIG. 5 and where there is a one-to-one correspondence in function the numbering has been retained. It is important is that in the target image plane detector 509 has been replaced with a receive BFE 601. This element consists of an array of pixels 602 that are capable of redirecting an incident light beam onto a specific element of a detector array 605. Detector array 605 is connected to receiver 606 and outputs data on data bus 607 to signal processor 564 for extraction of target information and delivery of processed data to user interface 566 via connection 565.

In the embodiment of FIG. 6, there is no need to incorporate a large detector array and receiver capable of detecting and processing large numbers of pixels. If the lidar system through transmit BFE 503 is capable of addressing N points at the target but only the smaller number M is used, it is only necessary for the detector array to have M elements (although it may be desirable to increase this number somewhat to allow for single target points to illuminate several adjacent pixels). Also, the pattern of the detector elements can be whatever is convenient (within optical design limitations). This can reduce the complexity of the detector/receiver by large factors, such as 1-3 orders of magnitude depending upon the application.

Moreover, in the embodiment of FIG. 6 there is generally no need to implement receiver controller circuitry that selects which detector array elements should be read out. Also, the lidar system can still address the same N target points as long as the receive BFE 601 contains N array elements. Further, the reduced number of required detector elements has a major advantage in designing detectors and receivers. Detector arrays with large pixel counts are typically laid out with a square or rectangular 2 dimensional pattern of elements. This is illustrated schematically in FIG. 7a) where a detector 701 comprises a number of individual light sensitive pixels 702. When pre-processing electronics is added it is commonly done by attaching a matching array of electronics 703, commonly referred to as a ROIC (Read-Out Integrated Circuit) to the detector array in a sandwich configuration. In this case the individual detector pixels 702 are connected to individual electronics sub-areas 704 with electrical connections 705 that may take several forms, bump bonding being one common approach.

The limitation with such architectures is that the physical size of the electronics sub-areas must generally on average be no larger than the size of the pixel element that sits in front of it, while noting that some improvement may be obtained by, for example, adding a lens array to permit the focusing of light of a given area to a smaller detector area. High-speed detectors and large pixel counts mean that these individual detector elements may measure in the range of 10-100 micrometers on a side. This severely limits the amount of electronics that can be placed on the same chip with the detector elements, even with state-of-the-art integrated circuit fabrication techniques. Reducing the number of detector elements eases this problem significantly. Not only is the cost associated with fabricating large arrays reduced, the power requirements are also reduced.

Figures 7A, 7B:
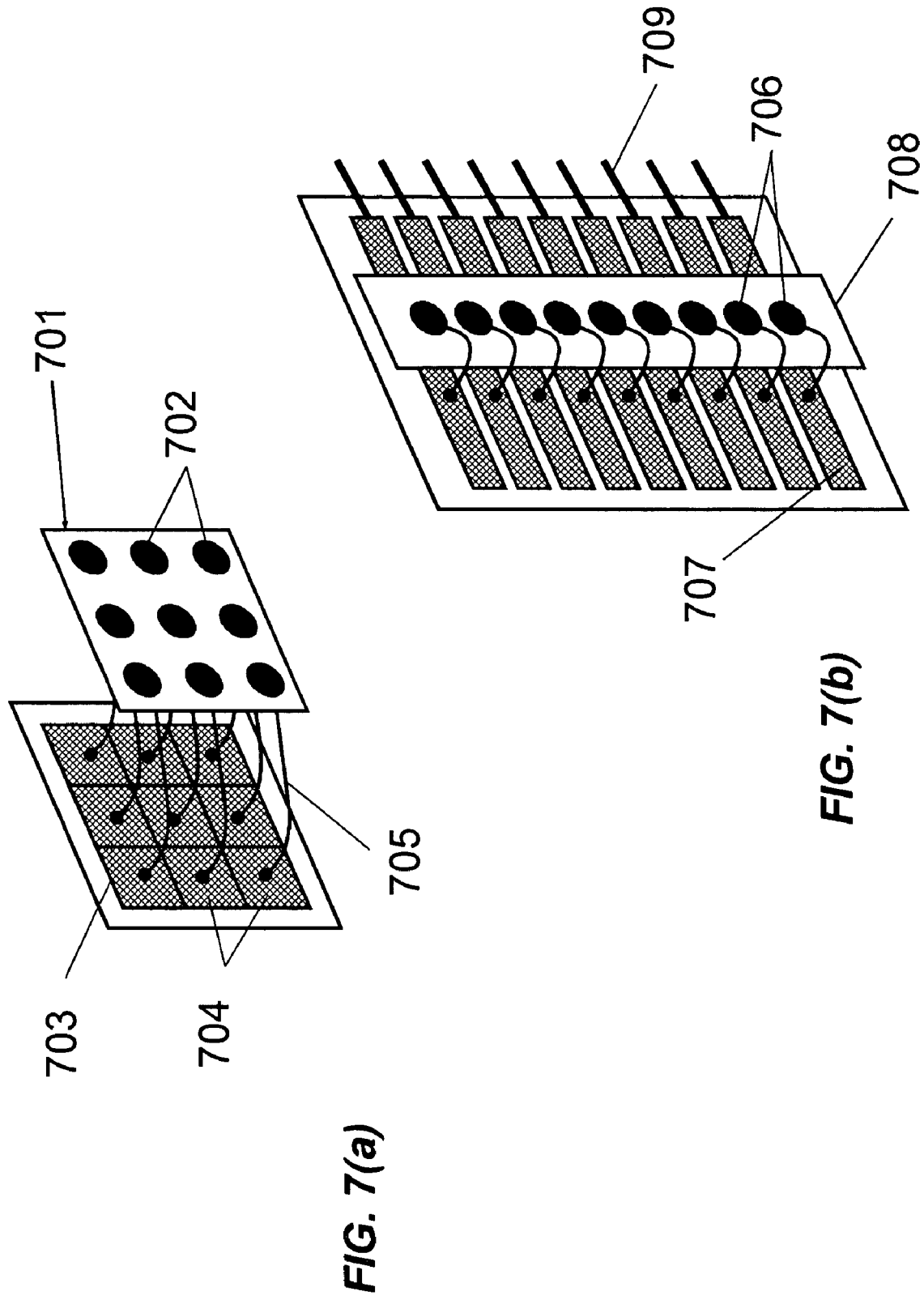
FIG. 7 shows two-dimensional and linear arrays of detectors and receiver electronics.

Even more important, in many cases, with a reduced pixel count there is less restriction on the geometry of the array. Since each image plane pixel can be pointed arbitrarily in 2 dimensions by the receive BFE one can, for example, select to point all pixels into sequential points along a line. When this is done there is generally only a restriction on the center-to-center spacing of the detector array elements, but there is less of a restriction in the second linear dimension. As illustrated in FIG. 7b) a linear array 708 of individual detector elements 706 can be coupled to associated electronics circuits 707 that are far wider perpendicular to the line of detector pixels. This allows for packing greater amounts of electronics into each cell associated with a given detector element and further provides for simple readout lines 709 along array edges. Clearly, this linear approach is only one of many possibilities that are apparent with fewer required pixels. For example, "butterfly" layouts where electronics areas are laid out in a staggered fashion on either side of the detector array are also possible and permits convenient data readout from both edges of the electronics chip.

As one further alternative one can produce the same effect of permitting a greater electronics area relative to the detector area by simply increasing the center-to-center spacing of detector elements in a rectangular or square array. High packing density is typically driven by the desire to maximize the fill factor of the array and minimize it's total size, but with the smaller pixel counts enabled through the implementation of a receive BFE the size issue may be less relevant, and given the flexibility to point image plane light essentially anywhere in a 2-dimensional space there is also no requirement on having a high fill factor.

As illustrated in FIG. 6 the system architecture is clearly applicable to both direct detection and coherent detection scenarios. In the coherent case the master oscillator 570 and associated elements 574, 572, 576, and 578 would be added in a manner similar to FIG. 5. In the case of coherent detection it is important to note that mixing the local oscillator beams with the receive beams prior to the receive BFE reduces the optical quality requirements on the receive BFE and any other optical elements that are present after the mixing. Optical distortions that occur in one beam (LO or signal) but not the other prior to mixing results in a degraded heterodyne efficiency. Distortions that occur after mixing effectively affect both component the same way and do not degrade the heterodyne efficiency.

The receive BFE 601 may be fabricated in a number of different ways and operation of the lidar system in the described manner is not dependent on a specific method of implementation. The type of device may be passive or active and it may also operate in transmission mode (as shown in FIG. 6) or in reflection. In transmission mode each receive BFE element 602 acts as a small prism for redirecting incident light to a predetermined detector pixel. In reflection mode each element acts as a small mirror tilted in a direction appropriate to direct the incident beam to a predetermined detector pixel. In addition to redirecting the individual pixels the each receive BFE may contain focal power to control the divergence of the output from the BFE in a desired manner.

One type of active device would be a liquid crystal array comprising N addressable cells. Each cell is then configured such that it acts as a prism (or tilted mirror if used in reflection mode). This is done by creating a linear phase gradient across the cell with a gradient corresponding to the desired deflection angle. To produce this effect it may be desirable that each addressable cell in turn comprises a number of smaller cells. By applying suitable voltage gradients to the cells the required phase gradients can be produced that in turn produce the desired steering of an incident beam. Such liquid crystal arrays can clearly be 1 dimensional or 2 dimensional for steering beams in 1 or 2 angular directions. An advantage of using liquid crystal devices is that they can be reprogrammed dynamically as conditions require. They can also incorporate additional functionality. For example, if required to prevent excessive spreading of the beams between the receive BFE and the detector, non-linear phase gradients may be added to refocus beams. A further advantage of programmable active devices like liquid crystal arrays is that the cell size can be dynamically altered. For example if a 1000×1000 element array is used it may be partitioned into 10000 cells each comprising 10×10 sub-cells or it could be partitioned into 1600 cells each comprising 25×25 sub-cells, or some other partitioning that is desired for a specific application.

A second type of device comprises an array of reflective mirrors. MEMS techniques have been developed to produce 2 dimensional arrays of individually addressable mirrors that can be inserted as the receive BFE. Such devices are fabricated for optical telecommunications crossbar switches.

Passive devices may also be advantageously used for the receive BFE. Fabrication of micro-prism arrays is relatively straightforward using e.g. lithographic techniques. One advantage of passive prism arrays over active devices is that they can easily be fabricated and replicated with very large pixel counts at low cost. A second advantage is that they require no power thereby generally reducing the cost, weight and complexity of the system.

An apparent disadvantage of passive prism (or mirror) arrays is that once the redirection function has been defined and fabricated it cannot easily be altered except by refabrication. For a general pattern of transmitted beams one must avoid situations where more than one imaged target point is redirected to a single detector pixel. With proper design this is not necessarily a significant drawback. It simply means that complete flexibility in generating and imaging beam patterns is not possible with a single passive element. However, since the redirection function of each BFE element can be defined a priori many different transmit beam patterns can be generated that still permit unambiguous pointing of receive BFE elements to detector pixels using a single receive BFE.

An example is shown in FIG. 8 where we assume for simplicity that the transmit BFE can address a 4×4 grid of points at the target but the detector array comprises only 4 elements. In FIG. 8a) is shown such a grid 801 of 16 addressable points. The center grid 802 illustrates the corresponding 16 point grid at the image plane where the receive BFE is placed. The last grid 803 illustrates the 4 detector elements. The idea is now to assign image plane pixels to detector pixels. Once such assignment is illustrated in the central grid of FIG. 8a) where each image plane pixel denoted by "1" is mapped to the detector element also denoted "1" in the detector grid, each image plane element denoted by "2" is mapped to the detector element denoted "2" etc. In practice this means that light reaching any of the image plane elements denoted by a given number is redirected to the detector element with the same number. With this mapping assignment (which is obviously not unique in any way) if we illuminate the target plane with laser light as shown in the left column of FIG. 8b) (illuminated target points 804 indicated with black circles) the result will be illumination of the corresponding points 805 in the image plane as illustrated by the central grid in FIG. 8b). Given the mapping shown in FIG. 8a) this in turn means that each of the illuminated image plane points gets redirected to a separate detector element and in this case all detector elements 806 receive signals. FIG. 8c)-f) show other target illumination patterns (again indicated by black circles) that would also unambiguously map image plane illumination to unique detector elements. It is then clear that even for this simple case, a single fixed mapping as shown in FIG. 8a) will permit the interrogation of targets with a wide variety of patterns, including vertical (a), horizontal (f), diagonal (c and g), sparse rectangular (d), and dense rectangular (e). The last row, FIG. 8h) shows an example of an illumination pattern that would not work. With the illumination shown in the left grid, all points illuminated at the image plane point the beams to the last detector element 808 resulting in an ambiguous detection situation. In some cases this ambiguity can be resolved, e.g., in the case of a pulsed lidar the range to the target maybe different for each of the pixels so the signals will arrive back at the receiver at different times, which will allow them to be separated, even though they fall on the same pixel.

As noted there is nothing unique about the exemplary mapping shown in this case. A very large number of mappings is possible, particularly as the number of grid elements (pixels) increases from N=16. It is also clear that if particular mappings cannot be unambiguously represented with a single fixed receive BFE, it is quite possible to incorporate multiple mappings into the lidar system. The technique could be the same as that described in conjunction with FIG. 4, e.g. the use of a turret holding multiple receive BFEs for insertion as needed.

In all cases discussed it is contemplated that it is part of the function of the system controller to track the mapping functions, and if multiple receive BFEs are incorporated, also control the insertion of such elements. An important difference between the fixed receive BFE and an active receive BFE is that the active device can be reprogrammed without the need for a physical change of the element.

7. Replaceable Subsystems

A very attractive possibility is apparent when considering system architectures such as the one illustrated in FIG. 1, namely that pre-aligned interchangeable subsystems can be created to meet specific imaging scenarios. Lidar systems, in particular coherent lidar systems, require very high degrees of alignment precision in order to properly overlap beams with detectors, and in the coherent case, overlap local oscillator beams with return signals. Performing such alignments in the field can be time consuming and difficult, yet may be required in order to retain system measurement flexibility. For example, if a measurement system uses passive fixed BFE elements to minimize cost, weight, and power, but needs to be switched from interrogating targets using a linear illumination pattern to a 2-dimensional grid pattern then multiple elements must be replaced or the disclosed technique of implementing switchable fixed elements may be used.

Figure 9:
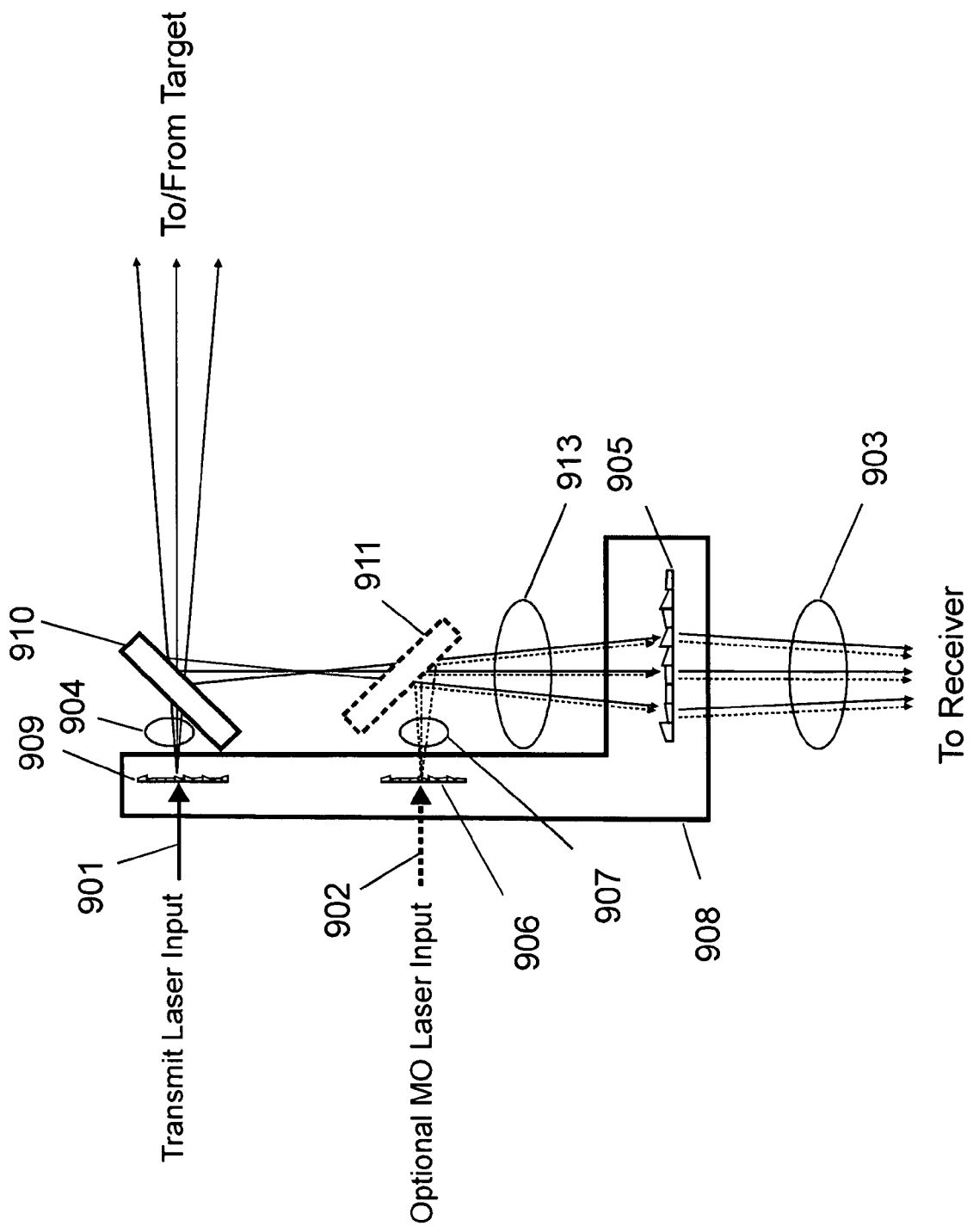
FIG. 9 shows an example of a configuration where the beam forming elements form a replaceable unit.

However, it is quite possible to create field replaceable subsystems that can be readily interchanged. FIG. 9 illustrates such a case where, what we refer to as the "beam forming subsystem" 908, defined by a transmit laser input beam 901, an MO laser input beam 902 (present in the coherent case), a set of target illumination beams 904, a set of LO beams 907 (present in the coherent case), a set of received signal beams 913, and a set of detector/receiver output beams 903. As in previous illustrations, within the beam forming subsystem 908, there are present a transmit BFE 909 that generates the target illumination beams 904, a LOBFE 906 to generate a set of matching local oscillator beams 907, and a receive BFE 905 to redirect received light 913 to the receiver. In this case the alignment issue relates to relative alignment between the transmit BFE, the receive BFE, and the LOBFE (if one is present).

With reference to FIG. 9 it is evident that if these elements are mounted as a subsystem having a common mechanical carrier or housing to form a beam forming subsystem 908 then the components can be aligned relative to one another in the common housing off-line and the entire beam forming subsystem 908 containing pre-aligned elements can be replaced in the lidar system as required. It is then possible to fabricate, align, and store a variety of pre-aligned subsystems for replacement as the needs for the imaging system changes. It is clear that such a pre-aligned subsystem can hold a variety of additional components, such as the polarizer 910 and beam splitter 911 normally deployed, but that the most important parts of such a subsystem are the BFEs.

8. Second Embodiment Incorporating a Receive BFE

Two additional embodiments of the present invention are of significant value when coherent detection is employed. This second embodiment, along with the third embodiment incorporating a receive BFE as discussed below, are not meant to provide a complete list of all possible configurations, merely to indicate that multiple variations are possible within the spirit of the invention. What is important in any implementation is not the specific architecture or details of the specific devices, but rather the functionality of the incorporated elements.

Figure 10:
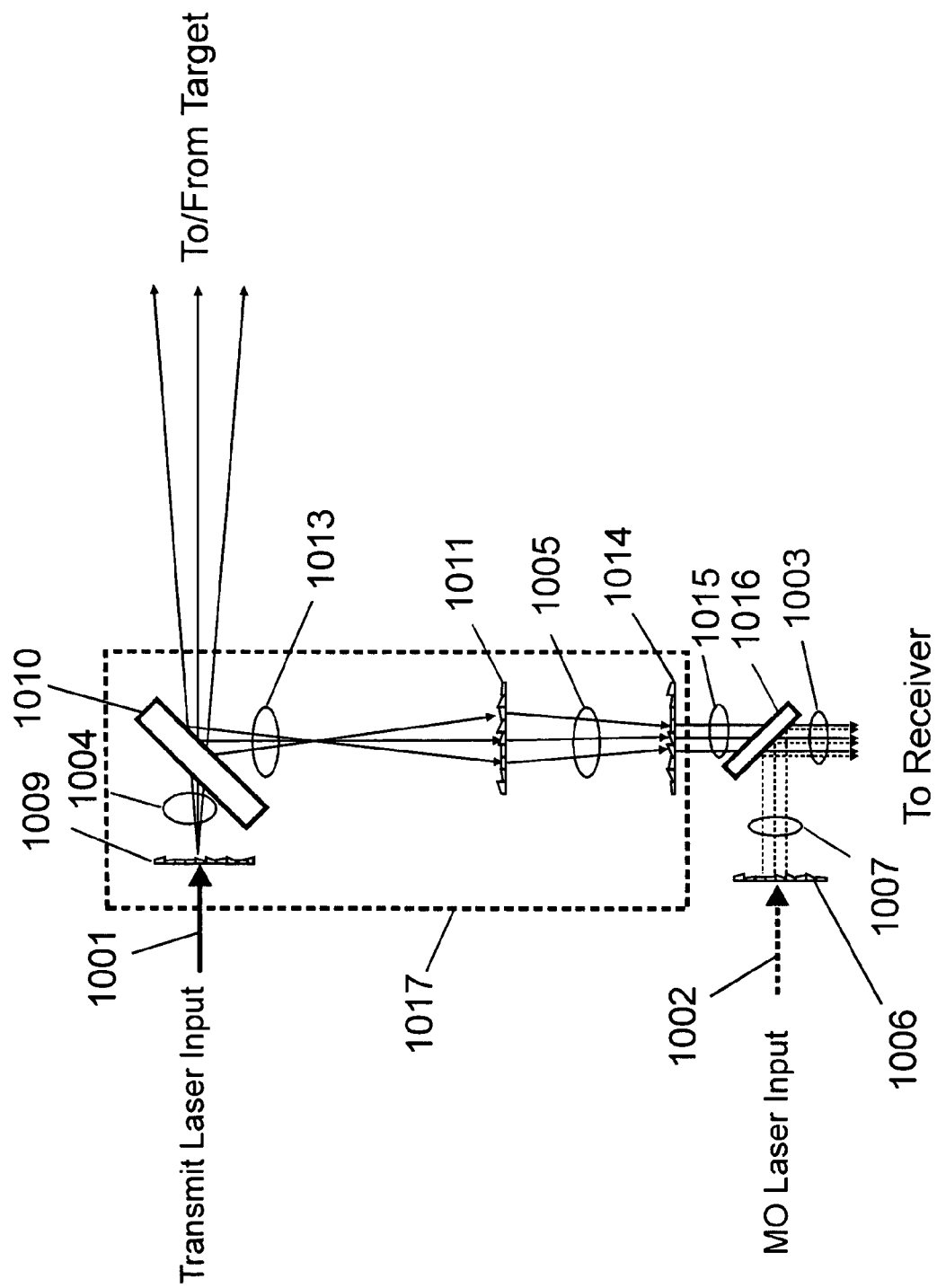
FIG. 10 shows a laser radar configuration according to an alternative embodiment of the invention.

FIG. 10 shows a beam forming subsystem for coherent detection wherein a transmit laser input beam 1001 is incident on a transmit BFE 1009 to produce a set of target illumination beams 1004 that are transmitted through a polarizer 1010 to the target. Received signal beams 1013 are reflected from polarizer 1010 and are transmitted to first receive BFE 1011. First receive BFE 1011 redirects the incident beams 1013 in the form of a second set of beams 1005 such that each of beams 1013 is incident on a separate element of second receive BFE 1014. Second receive BFE 1014 in turn redirects beams 1005 in such a manner that resulting set of beams 1015 propagates as a set of parallel beams towards the detector receiver. The spacing of the set of beams 1015 is generally such that each beam in the set is incident on a separate element of the detector array and each beam in the set has a size that substantially matches the size of each detector pixel.

Separately master oscillator beam 1002 is incident on MOBFE 1006 to generate a set of local oscillator beams 1007 that are formed in such a manner that upon reflection from beam splitter 1016 each local oscillator beam in the set 1007 is substantially matched in propagation angle, transverse position, and transverse size to a corresponding beam in previously noted set of received beams 1015. This arrangement causes efficient optical mixing between the local oscillator beams 1007 and received signal beams 1015 to produce a set of coherently mixed beams 1003 that propagate to the detector/receiver.

First we note that the combination of two receive BFE elements with some spatial separation between then, each of which can steer an incident beam in two angles, means that each received and redirected beam that emerges from second receive BFE 1014 can be directed at an arbitrary angle at an arbitrary position. This is a frequently used feature in manipulating optical beams. For this reason it may be convenient to use the two receive BFE elements to create a regularly spaced array of beams 1015 that propagate in parallel towards the detector array. Any other distribution could also be created but this arrangement is often convenient in matching the receive beams with a set of regularly spaced local oscillator beams, the latter of which is generally easy to produce.

Second, with this arrangement it is always sufficient to generate a fixed set of local oscillator beams regardless of the distribution of target illumination beams. Two receive BFE devices can always be used to match the receive beam pattern to a pre-existing set of local oscillator beams, provided only that the number of transmit beams does not exceed the number of local oscillator beams.

Third, it is apparent that the arrangement in FIG. 10 effectively decouples the LO generation problems from the illumination and reception problem. This means that complete subsystems for specific imaging scenarios may be produced, for example as field replaceable units, by incorporating for example the elements shown outlined with box 1017 as a single unit subassembly.

Fourth, a number of relatively simple methods exist to generate the requisite set of local oscillator beams. In the case where a rectangular or linear detector array exists that has a relatively high fill factor, the simplest method would be to simply expand the transverse extent of the master oscillator beam to fill the entire array aperture. In this case there is no actual division of the MO beam into separate LO beams which is very simple to do using simple optics. Generating a regularly spaced one or two dimensional array of LO beams to match a similarly shaped detector array is straightforward through the use of diffraction gratings and lenses. These may be produced such that all individual LO beams are parallel to match the configuration shown in FIG. 10. At the same time we stress that that parallelism of beams is not a requirement. Coalignment of the LO beams with the set of received signal beams 1015 to match a set of detectors is the primary objective. It is consequently apparent that the set of beams 1015 generated by receive beam forming elements 1011 and 1014 need not to be parallel but could be dispersed with some angular distribution suitable to match the generated LO beams and the detector array geometry.

9. Third Embodiment Incorporating a Receive BFE

Figure 11:
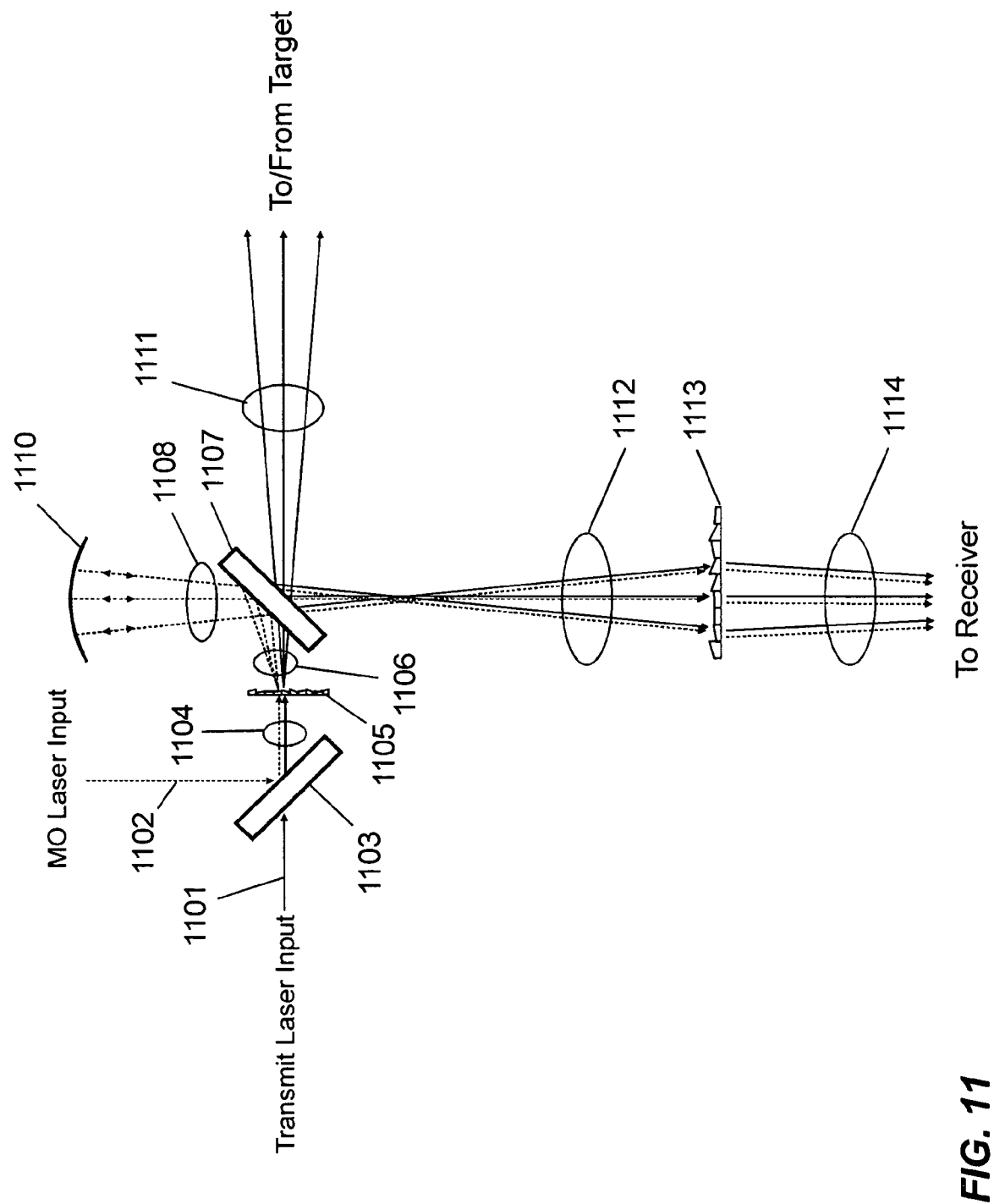
FIG. 11 shows a laser radar configuration according to a second alternative embodiment of the invention.

A third embodiment of the invention to incorporate a receive BFE element is illustrated in FIG. 11. The central idea of this third embodiment is that in measurement situations where there is not a need to produce different angular distributions of transmitted and LO light (due to time of flight and lag angle compensation considerations as described above), it may be advantageous to use the same BFE element to produce both light distributions. This may save cost and components and can also be advantageously used reduce the alignment requirements between multiple elements. Numerous system architectures can be used to incorporate this idea, one of which is illustrated in FIG. 11,.

In FIG. 11 a transmit input beam 1101 and an MO laser input beam 1102 are combined in an optical element 1103 to produce two co-propagating beams. One convenient method to implement this combination is to use different linear polarization states for the two beams, for example ensuring that transmit beam 1101 is polarized in the plane of the paper and MO beam 1102 is polarized perpendicular to the plane of the paper. In this case optical element 1103 can be a simple polarizing beam splitter with coatings designed to reflect and transmit different polarization states differently. Such elements are commonly used in optical systems and are widely available. Co-propagating beams 1104 are shows with a slight transverse offset for visual clarity, as has been done in previous figures, but in practical cases the two beams may overlap spatially. Beams 1104 are next incident on BFE element 1105 to produce two sets of diffracted beams 1106 with substantially identical angular distributions. These two sets of beams propagate to optical element 1107 that splits the two sets in such a manner that the beam set generated from transmit beam 1101 propagate through element 1107 as beams 1111 and continue to the target. The set of beams generated from MO beam 1102 reflect off element 1107 as a set of beams 1108. This may again be accomplished by making element 1107 an appropriately coated polarizing beam splitter. As in previous embodiments light scattered from the target returns through the system and is reflected off element 1107. As noted previously this may be accomplished by also incorporating a quarter-wave plate in the transmit beam portion of the system. At this stage the receive beams reflected off element 1107 have the same polarization as beams 1108.

Beams 1108 in turn reflect from optical element 1110 in such a manner that the incident beams retrace their paths back to optical element 1107. If element 1107 is a perfect polarizing beam splitter the retracing beams will now reflect from element 1107 rather than be transmitted through the device to mix with the received signal beams. One method to prevent this problem from occurring is to design reflective coating to be slightly imperfect for the appropriate polarization state. For example a coating may be designed to substantially completely transmit the transmit beam polarization to efficiently produce the desired transmit beam pattern. At the same time the coating can be designed to be somewhat "leaky" for the opposite polarization state. It may, for example, reflect 90% of the light and transmit 10%. In that case 90% of the return signal light is reflected from element 1107 and is mixed with the 10% of the MO light reflected from element 1110 to produce optically mixed beams 1112 that co-propagate to receive BFE 1113 where they are redirected to the detector/receiver array as beams 1114 in a manner described above. In the described architecture it is clear that if 90% of the MO beam light from transmit BFE 1103 is reflected towards element 1110 then 10% of the light is also transmitted toward the target. This is normally not problematic since the peak power of this light is substantially lower than the peak power in the transmit beams. To prevent detrimental issues caused by scattering of this light back into the system towards the detector it is also feasible to insert additional elements in the path of beams 1111, such as additional polarizers to absorb or reflect this stray MO light, possibly used in conjunction with additional baffles or absorbing materials. It is also noted that element 1110 is illustrated as a mirror in FIG. 11. This element could also comprise a phase conjugator, a fixed BFE element as described above, or a combination of optical elements that have the effect of retracing the optical beams incident on it.

While the present invention has been shown and described in the context of specific examples and embodiments thereof, it will be understood by those skilled in the art that numerous changes in the form and details may be made without departing from the scope and spirit of the invention as encompassed in the appended claims. Examples of such changes include, but are not limited to:

Alternative implementations of lasers. The invention is not limited to the specific implementation of lasers for transmission of light or their use as master oscillators. As illustrated in the document the master oscillator has been shown as a separate element from the transmitter laser for ease of illustration only. In some circumstances there may be only one laser present and light is split off and used for multiple purposes. For example, there may be one laser whose output is split into two parts, where one part is used for the local oscillator beam, and one part is used for the transmit laser, perhaps with a pulsed or continuous-wave amplifier inserted in the transmit beam. In such a case a suitable frequency shifter may be inserted into one of the beams to produce a desired relative frequency shift. In an alternative implementation the two lasers (LO and transmitter) may be two separate units that are locked together electronically by, for example, beating them together on a detector to determine the frequency difference and using servos and tuning elements to maintain a desired frequency difference (that could include no difference frequency).

Alternative system receiver/signal processing implementations. The invention does not in any manner depend on the specific implementation of means for detecting and processing received light signals, except as specified herein. The invention is therefore equally usable with coherent and incoherent detection, as well as with autodyne detection wherein a part of the received signal is itself used as the local oscillator.

We claim:

1. A system for observing a field of view, wherein the field of view comprises a plurality of potential target points, the system comprising:
   a transmitter;
   a detector comprising a plurality of detector elements, wherein a path is defined between the transmitter and the detector,
   wherein the transmitter is configured to generate electromagnetic (EM) energy into a transmit portion of the path,
   wherein the detector is positioned in a receive portion of the path defined by reflected EM energy from some of the plurality of potential target points;
   a beam forming element configured to select at least one of a plurality of illumination patterns, to selectively generate M beams out of N possible beams to produce an illumination pattern, and to illuminate simultaneously a selected subset of the plurality of potential target points in the field of view using M beams out of N possible beams, the subset including multiple predetermined areas within the field of view, wherein M is an integer, N is an integer, and M is less than N; and
   a second beam forming element positioned in the receive portion of the path, the second beam forming element configured to select a subset of the plurality of detector elements and to steer the receive portion of the path to the selected subset of the plurality of detector elements.

2. The system of claim 1 wherein the beam forming element is positioned in the transmit portion of the path.

3. The system of claim 1 further comprising, means for configuring at least a portion of the path such that the subset of the plurality of potential target points are to be included in the path, wherein the means for configuring comprises the beam forming element.

4. The system of claim 3 further comprising a signal processor coupled to the detector and operable to process signals generated by the detector, wherein the signal processor is coupled to the means for configuring at least a portion of the path to select a subset of the plurality of detector elements for processing.

5. The system of claim 3 further comprising a local oscillator (LO) for producing a laser beam aligned with the receive portion of the path to implement coherent detection.

6. The system of claim 5 wherein the LO is configured to use the means for configuring at least a portion of the path.

7. The system of claim 5 further comprising a second means for configuring at least a portion of the path, wherein the LO is configured to use the second means for configuring.

8. The system of claim 3 wherein the means for configuring at least a portion of the path comprises fixed passive elements.

9. The system of claim 3 wherein the means for configuring at least a portion of the path comprises switchable passive elements.

10. The system of claim 3 wherein the means for configuring at least a portion of the path comprises active elements.

11. The system of claim 3 wherein the means for configuring at least a portion of the path comprises a device selected from the group consisting of: liquid, crystal array, deformable mirror, micro-mirror array, micro-prism array, transmissive phase control devices, diffractive optical devices, refractive optical devices and holograms.

12. The system of claim 1 wherein the beam forming element is configured to alter one or more characteristics of the EM energy selected from the group consisting of: direction, phase, frequency, amplitude and polarization.

13. The system of claim 1 wherein the beam forming element is configured to alter one or more characteristics of the reflected EM energy selected from the group consisting of: direction, phase, frequency, amplitude and polarization.

14. The system of claim 1 further comprising a signal processor coupled to the detector and operable to process signals generated by the detector.

15. The system of claim 1 wherein the detector comprises a number of elements that is larger than the number in the subset of the plurality of potential target points.

16. The system of claim 1 wherein the detector comprises a number of elements that is substantially equal to the number in the subset of the plurality of potential target points.

17. The system of claim 1 wherein the detector comprises a number of elements that is less than the number in the subset of the plurality of potential target points.

18. The system of claim 1 wherein the selected subset of the plurality of potential target points comprises a selectable two-dimensional pattern.

19. The system of claim 1 wherein the beam forming element is configured to illuminate a first selected pattern of the plurality of potential target points and to move the first selected pattern to fill in a second selected pattern of the plurality of potential target points over a predetermined period of time, wherein the second selected pattern is larger than the first selected pattern.

20. The system of claim 1 wherein the selected subset of the plurality of potential target points comprises three sub-areas, 6×6 sub-areas, or larger sub-areas.

21. The system of claim 1 wherein the beam forming element is configured to produce non-parallel independently pointing beams.

22. The system of claim 1 wherein the beam forming element is programmable to produce a selectable illumination pattern, and the second beam forming element is programmable to flexibly select a subset of the plurality of detector elements.

23. The system of claim 1 wherein the beam forming element is configured to produce an arbitrary illumination pattern.

24. The system of claim 1 wherein there is no one-to-one relationship between M beams and the number of active pixels in the detector.

25. The system of claim 1 wherein the beam forming element and the second beam forming element are mounted as a beam forming subsystem having a common mechanical carrier or housing,
wherein the beam forming element and the second beam forming element are aligned relative to one another in the common mechanical carrier or housing off-line, and
wherein the beam forming subsystem is configured to be field replaceable in that the beam forming subsystem is configured to be interchangeable in a field as a unit with a second pre-aligned beam forming subsystem, without performing in the field alignment of multiple elements of the second pre-aligned beam forming subsystem.

26. A method for observing a field of view, wherein the field of view comprises a plurality of potential target points, the method comprising:
transmitting electromagnetic (EM) energy into a transmit portion of a path;
directing the light path to the field of view, wherein some of the EM energy in the path is reflected to form a receive portion of the path, the step of directing comprising:
selecting at least one of a plurality of illumination patterns;
selectively generating M beams out of N possible beams to produce an illumination pattern, wherein M is an integer, N is an integer, and M is less than N; and
illuminating simultaneously a selected subset of the plurality of potential target points in the field of view using M beams out of N possible beams, the subset including multiple predetermined areas within the field of view; and
detecting the reflected EM energy, the step of detecting comprising:
selecting a subset of a plurality of detector elements; and
steering the receive portion of the path to the selected subset of the plurality of detector elements.

27. A method comprising using the method of claim 26 to determine a characteristic of an object in the field of view.

28. The method of claim 27 wherein the characteristic is selected from the group consisting of: range, speed, velocity, acceleration, direction of motion, vibration, texture, reflectivity, color, dimension and shape.

29. The method of claim 26 further comprising configuring at least a portion of the path such that the subset of the plurality of potential target points are included in the path,
wherein the act of configuring at least a portion of the path comprises:
configuring the transmit portion of the path to direct the path to only selected location in the field of view.

30. The method of claim 29 wherein the act of configuring at least a portion of the path further comprises:
configuring the receive portion of the path to direct the receive portion of the path to selected portions of a detector used to perform the detecting.

31. The method of claim 29 wherein the act of configuring the path further comprises altering one or more characteristics of the EM energy selected from the group consisting of: direction, phase, frequency, amplitude and polarization.

32. A system for observing a field of view, wherein the field of view comprises a plurality of potential target points, the system comprising:
a transmitter;
a detector comprising a plurality of detector elements, wherein a path is defined between the transmitter and the detector,
wherein the transmitter is configured to generate electromagnetic (EM) energy into a transmit portion of the path,
wherein the detector is positioned in a receive portion of the path defined by reflected EM energy from some of the plurality of potential target points;
a beam forming element configured to select at least one of a plurality of illumination patterns, to selectively generate M beams out of N possible beams to produce an illumination pattern, and to illuminate simultaneously a selected subset of the plurality of potential target points in the field of view using M beams out of N possible beams, the subset including multiple predetermined areas within the field of view, wherein M is an integer, N is an integer, and M is less than N; and
a detector controller coupled to the detector, the detector controller configured to receive information as to which of the plurality of detector elements are valid and to enable data output from only the plurality of detector elements that contain valid data.

* * * * *